(12) United States Patent
Yorke et al.

(10) Patent No.: US 9,951,738 B2
(45) Date of Patent: Apr. 24, 2018

(54) METHOD OF SIGNALING AN ENGINE STOP OR START REQUEST

(71) Applicant: Voyomotive, LLC, Ypsilanti, MI (US)

(72) Inventors: Peter Yorke, San Francisco, CA (US); Robert Vogt, IV, Ypsilanti, MI (US); Adam Sloan, Ann Arbor, MI (US)

(73) Assignee: Voyomotive, LLC, San Francisco, CA (US)

( * ) Notice: Subject to any disclaimer, the term of this patent is extended or adjusted under 35 U.S.C. 154(b) by 52 days.

(21) Appl. No.: 14/623,173

(22) Filed: Feb. 16, 2015

(65) Prior Publication Data

US 2015/0260143 A1    Sep. 17, 2015

Related U.S. Application Data

(60) Provisional application No. 61/951,066, filed on Mar. 11, 2014.

(51) Int. Cl.
*F02N 11/08* (2006.01)
*B60T 7/04* (2006.01)

(52) U.S. Cl.
CPC .......... *F02N 11/0822* (2013.01); *B60T 7/042* (2013.01); *F02N 2200/102* (2013.01); *Y02T 10/48* (2013.01)

(58) Field of Classification Search
CPC .......... F02N 11/0822; F02N 2200/102; B60T 7/042; B60T 8/173; B60T 8/52; Y02T 10/48; B60W 10/06; B60W 10/08; F02D 17/04; F02D 41/065
USPC ................................. 701/101, 112
See application file for complete search history.

(56) References Cited

U.S. PATENT DOCUMENTS

| 6,135,920 | A | * | 10/2000 | Kamiya | B60W 10/06 |
| | | | | | 477/185 |
| 6,251,046 | B1 | * | 6/2001 | Yoshino | F02D 17/04 |
| | | | | | 477/187 |
| 6,341,826 | B2 | * | 1/2002 | Onogi | B60T 8/172 |
| | | | | | 180/197 |
| 6,346,064 | B1 | * | 2/2002 | Hada | B60K 6/543 |
| | | | | | 477/171 |

(Continued)

FOREIGN PATENT DOCUMENTS

| EP | 0444843 A2 * | 9/1991 | ............. G01C 19/72 |
| EP | 0444843 B1 | 10/1996 | |

(Continued)

OTHER PUBLICATIONS

The International Search Report and Written Opinion of the International Searching Authority for PCT/US2015/16028, date completed Apr. 23, 2015, dated May 22, 2015.

*Primary Examiner* — Thomas Moulis
*Assistant Examiner* — John Bailey
(74) *Attorney, Agent, or Firm* — The Petruzzi Law Firm; James D. Petruzzi

(57) ABSTRACT

This invention provides a computer implemented method which allows the driver to request engine shut down and engine and restarts the engine of a motor vehicle by changing driver brake pedal force, that is, the force which the driver applies to the brake pedal, after the vehicle has stopped. After the vehicle has stopped, changes in the driver brake pedal force are compared to threshold values to determine if the driver is requesting an engine stop or an engine start.

40 Claims, 24 Drawing Sheets

(56) References Cited

U.S. PATENT DOCUMENTS

| | | | | |
|---|---|---|---|---|
| 6,347,608 | B1* | 2/2002 | Hara | F02N 11/084 123/179.4 |
| 6,404,072 | B2* | 6/2002 | Onoyama | B60K 6/485 290/40 A |
| 6,456,927 | B1* | 9/2002 | Frankowski | G01L 23/225 123/406.21 |
| 7,043,354 | B2* | 5/2006 | Braun | F02N 11/0833 123/179.15 |
| 7,162,916 | B2* | 1/2007 | Zavarehi | F02D 41/1497 73/114.13 |
| 7,204,134 | B2* | 4/2007 | Matsuo | G01F 1/34 73/114.33 |
| 7,516,007 | B2* | 4/2009 | Tamai | B60T 7/122 701/22 |
| 7,650,220 | B2* | 1/2010 | Marszalek | F02D 41/266 701/102 |
| 7,734,406 | B1* | 6/2010 | Oppenheimer | B60T 8/885 180/197 |
| 7,756,670 | B2* | 7/2010 | Mancosu | B60T 8/172 702/151 |
| 8,224,531 | B2* | 7/2012 | Corniglion | B60T 7/12 701/112 |
| 8,382,642 | B2* | 2/2013 | Saito | B60W 10/06 477/185 |
| 8,874,297 | B2* | 10/2014 | Bang | B60L 11/14 180/65.8 |
| 8,998,774 | B2* | 4/2015 | Yu | F02N 11/0822 477/203 |
| 9,013,292 | B2* | 4/2015 | Aberizk | B60Q 1/302 340/467 |
| 9,428,172 | B2* | 8/2016 | Tanaka | B62M 6/45 |
| 2002/0028726 | A1* | 3/2002 | Morimoto | F02D 17/04 477/102 |
| 2003/0004635 | A1* | 1/2003 | Kamiya | B60W 10/06 701/112 |
| 2003/0058118 | A1* | 3/2003 | Wilson | B60C 23/0423 340/679 |
| 2003/0139692 | A1* | 7/2003 | Barrey | A61B 5/061 600/595 |
| 2005/0057095 | A1* | 3/2005 | Hac | B60T 8/1755 303/122 |
| 2008/0262691 | A1* | 10/2008 | Ludwig | B60T 7/122 701/79 |
| 2010/0004829 | A1* | 1/2010 | Tanaka | B60K 6/48 701/48 |
| 2010/0076634 | A1* | 3/2010 | Brigham | B60K 6/485 701/22 |
| 2011/0071001 | A1* | 3/2011 | Yu | B60K 6/485 477/203 |
| 2011/0256981 | A1* | 10/2011 | Saito | B60W 10/06 477/183 |
| 2012/0191317 | A1* | 7/2012 | Mueller-Lerwe | B60T 7/042 701/93 |
| 2013/0096810 | A1* | 4/2013 | Correia | F02D 17/04 701/112 |
| 2013/0317679 | A1* | 11/2013 | Tanaka | B62M 6/45 701/22 |
| 2014/0012442 | A1* | 1/2014 | Wang | B60K 6/445 701/22 |
| 2014/0066255 | A1* | 3/2014 | Yu | F02N 11/0822 477/203 |
| 2014/0066256 | A1* | 3/2014 | Yu | F02N 11/0822 477/204 |

FOREIGN PATENT DOCUMENTS

| | | | |
|---|---|---|---|
| EP | 0914997 A2 * | 5/1999 | B60T 8/00 |
| EP | 1052400 B1 | 10/2004 | |
| EP | 0914997 B1 | 9/2009 | |
| GB | 2413999 B | 8/2008 | |
| WO | WO 2010/102719 A1 | 9/2010 | |
| WO | WO 2013/084697 A1 | 6/2013 | |

* cited by examiner

METHOD OF SIGNALING AN ENGINE STOP OR START REQUEST

CROSS REFERENCE TO RELATED APPLICATIONS

This application asserts priority from provisional application 61/951,066, filed on Mar. 11, 2014, which is incorporated herein by reference.

FIELD OF INVENTION

The invention relates to a method for increasing fuel economy in a motor vehicle and for reducing engine wear which occurs when an engine is idling. More particularly, this invention relates to a computer implemented method which allows the driver to signal a vehicle system to turn off or restart the engine of a motor vehicle. The driver is able to request that the engine be shut off by increasing the force on the brake pedal after the vehicle has come to a stop and request an engine restart by decreasing the force on the brake pedal. The method uses multiple values of the driver brake pedal force rather than single values, to determine if changes in driver brake pedal force are a request to shut off or turn on an engine in a motor vehicle.

BACKGROUND OF THE INVENTION

Methods of stopping the engine of a stopped motor vehicle are known. EP Patent 1,052,400 relates to a system for automatically stopping and restarting an internal combustion engine for an automotive vehicle and particularly, to an automatic stop-restart system of an automotive internal combustion engine in which the engine is automatically stopped when the vehicle is in its stopped state, and automatically restarted from the vehicle stand-still state.

GB Patent 2413999B relates to a method for controlling an operation of a motor vehicle with a combustion engine, especially a hybrid vehicle with at least one additional electric motor, and an automatic start-stop unit for the automatic cut-off and automatic starting of the combustion engine of the motor vehicle in the presence of corresponding stop and/or start conditions. Furthermore, the invention relates to a motor vehicle with a corresponding automatic start-stop unit.

U.S. Pat. No. 6,135,920 relates to an engine automatic speed control apparatus which exhibits a smooth transition from brake release to an engine drive state. An ECU determines brake force such that a vehicle does not move in correspondence with the slope of a road surface according to a road surface slope sensor while monitoring an operated quantity of a brake pedal according to a brake pedal operated-quantity sensor. The ECU stops an engine when braking force is applied via the brake pedal such that the vehicle does not move. After stopping the engine, the ECU determines braking force such that the vehicle does not move in correspondence with slope of the road surface according to the road surface slope sensor, and restarts the engine when braking force becomes less than braking force required to maintain the vehicle in a stopped state. The ECU then restarts the engine in the interval from relaxing of braking force via the brake pedal until the brake pedal is released.

U.S. Pat. No. 6,251,046 relates to an automatic engine-stop control apparatus for a vehicle, includes a vehicle speed sensor and a brake pedal depression sensor which are coupled to a control unit. The control unit is programmed to decide that the vehicle speed detected by the vehicle speed sensor is smaller than or equal to a predetermined stop expected speed when the brake pedal depression sensor detects that the brake pedal is depressed, and to decide that the vehicle is stopped when a predetermined time period elapses from a moment that the vehicle speed becomes smaller than or equal to the predetermined stop expected speed and when the depression of the brake pedal is continued.

U.S. Pat. No. 8,224,531 relates to a method implemented in a vehicle using information representative of an operational state of the vehicle being provided by sensors and a data communication bus. The information is representative of the engagement and disengagement of an exploitation assistance brake (EAB) and a speed of the vehicle and of a force on a brake pedal of the vehicle. A cut-off condition (C3) for the thermal engine can be validated when the speed is lower than a predetermined threshold and in the case where force is applied on the brake pedal or when the exploitation assistance brake is activated. The system includes at least one sensor for the condition of the exploitation assistance brake.

US Patent Application 20120191317 relates to a device and a method for controlling the operation of an internal combustion engine in a motor vehicle with a brake line, at least one sensor for measuring the brake line pressure in the brake line, a stop-start device for automatically switching off and starting the internal combustion engine, and an adaptive cruise control device for regulating the vehicle speed as a function of environmental information captured in a sensor-based manner, wherein a brake cylinder acting on the brake line is associated with the adaptive cruise control device and wherein the stop-start device and the adaptive cruise control device are coupled to one another in that the automatic switching-off and starting of the internal combustion engine via the stop-start device is executed directly as a function of the brake line pressure measured by the sensor.

US Patent Application 20130096810 relates to a system for a vehicle and includes a fuel control module and a voltage setting module. The fuel control module cuts off fuel to an engine during a deceleration fuel cutoff (DFCO) event. During the DFCO event, the voltage setting module monitors a brake pedal position, sets a desired voltage to a first predetermined voltage when a brake pedal is not depressed, and sets the desired voltage to a second predetermined voltage when the brake pedal is depressed. The second predetermined voltage is greater than the first predetermined voltage. A regulator generates a pulse width modulation (PWM) signal based on the desired voltage and applies the PWM signal to an alternator.

WO Patent Application 2010/102719 relates to a method for automatically turning off a drive unit in a motor vehicle in the presence of a predetermined condition for turning off said drive unit, wherein by way of a control device, the generated brake pressure and/or the generated brake torque is monitored and evaluated, and wherein a condition for turning off said drive unit is considered fulfilled when after reaching the motor vehicle standstill, the monitored brake pressure or the monitored brake torque exceeds a predetermined turning off brake pressure threshold value or turning off brake torque threshold value. The invention is characterized in that the turning off brake pressure threshold value is composed of a predetermined standstill brake pressure and a predetermined margin of safety, and/or the turning off brake torque threshold value from a predetermined standstill brake torque and a predetermined margin of safety, wherein the standstill brake pressure or the standstill brake torque is predetermined such that the motor vehicle is just kept stationary upon applying the standstill brake pressure or torque with the drive unit being turned on and off.

WO 2013/084697 relates to an automatic vehicle-engine control device which, when coasting, stops the engine if a detected brake-pedal operation amount reaches or exceeds a first operation-amount threshold, and after stopping the engine, restarts the engine when detected negative pressure falls below a first negative-pressure threshold.

Idling an engine in a stopped vehicle is very inefficient. The engine is burning fuel, and since the vehicle isn't moving, when idling, the vehicle is getting 0 MPG (zero miles per gallon). In addition, because the engine isn't working at its peak operating temperature when it's idling, the fuel doesn't undergo complete combustion. This leaves fuel residues that can contaminate engine oil and damage engine parts. For example, fuel residues tend to deposit on spark plugs. As the amount of engine idling increases, the plugs' average temperature drops, and the tendency for the spark plugs to become fouled becomes worse. This, in turn, can increase fuel consumption by four to five percent. Excessive idling can also let water condense in the vehicle's exhaust. This can lead to corrosion and reduce the life of the exhaust system. Shutting off the engine instead of allowing it to idle also reduces the wear on the core, expensive engine components including engine components such as the cylinder head, crankshaft, camshaft, and fuel pump.

Driver controlled engine stops can be more efficient than automated stops. Generally, an automated engine start/stop system allows 2-3 seconds of idling before shutting off the engine. An automated engine start/stop system cannot anticipate how long an engine shut down should last, and therefore can cause short, unproductive engine shut downs, which consume more fuel than they save. There is a need for a method to allow the driver to stop and restart the engine when a vehicle will be stopped for a significant length of time.

BRIEF SUMMARY OF THE INVENTION

The present invention relates to a computer implemented method for increasing fuel economy in a motor vehicle and for reducing engine wear which occurs when an engine is idling. More particularly, this invention relates to a method which allows the driver to signal an engine start stop device in the vehicle to turn off or restart the engine of a motor vehicle. The driver signals a desire to shut off the engine of a stopped vehicle by applying an increasing force to the brake pedal after the vehicle stops. The driver brake force is sampled and the measurements are passed through a fast filter and a slow filter. The output of the slow filter is subtracted from the output of the fast filter to produce a total filter output. The total filter output is compared to a difference threshold. The driver brake pedal force is compared to two thresholds. The first threshold is minimum brake pedal force threshold. The second threshold is the maximum brake pedal force threshold. The minimum brake pedal force threshold is minimum brake force required to stop the vehicle on a level surface. The maximum brake pedal force threshold is the maximum brake force likely to be used in stopping the vehicle in a non-panic stop. When all the following conditions are met:
  (a) the vehicle is stopped,
  (b) the force applied to the brake pedal exceeds a minimum brake pedal force threshold,
  (c) the force applied to the brake pedal is less than the maximum brake pedal force threshold at the time when the vehicle speed reaches zero, and
  (d) the total filter output 7 is positive and exceeds a threshold, the change in driver brake pedal force is interpreted as a driver request to shut off the engine.

The driver signals a desire to start the engine of a stopped vehicle by applying a decreasing force to the brake pedal after the vehicle stops. If the force applied to the brake is less than the minimum brake pedal force threshold, or the total filter output is negative and below a threshold, a device embodying the method will signal the engine to start.

The computer implemented method may be embodied as a computer program and a data file stored in read only memory (ROM) in a device added to a motor vehicle. Alternatively, it may be embodied as a computer program operating in a vehicle ECU. The present invention will operate with a variety of engine start stop devices. For example, the start stop device could be a 12 volt start stop system, a hybrid electric system, an extended range hybrid electric system, a hydraulic hybrid system, or a fuel cell hybrid system. A 12 volt start stop device shuts off the engine by removing power from the engine spark plugs and fuel injectors and starts the engine using a twelve volt starter motor powered by electrical energy stored in the vehicle 12 volt battery. A hybrid electric start stop system shuts off the engine by removing power from the engine spark plugs and fuel injectors and starts the engine using a starter motor connected to the engine. The starter motor is powered by a hybrid battery that is separate from the vehicle 12 volt battery. An extended range hybrid electric system shuts off the engine by removing power from the engine spark plugs and fuel injectors and starts the engine using a starter motor connected to the engine. The extended range hybrid system is powered by electrical energy stored in an extended range hybrid battery that is separate from the vehicle twelve volt battery. A hydraulic hybrid system shuts off the engine by removing power from the engine spark plugs and fuel injectors and starts the engine using a hydraulic motor connected to the engine. This motor is powered by pressurized hydraulic fluid stored in a hydraulic accumulator. A fuel cell hybrid system shuts off the engine by removing power from the engine spark plugs and fuel injectors and starts the engine using a starter motor connected to the engine. The starter motor is powered by electrical energy from a fuel cell. The engine start stop device could be an OEM (original equipment manufacturer) system included with the vehicle at the time of manufacture, or it could be an aftermarket system that is installed on the vehicle after the vehicle has been manufactured.

Frequently, the engine start stop device will have additional conditions that need to be met before an engine shut off or engine start is allowed, such as the engine being within an optimal temperature range. An engine start stop device will start or stop an engine when a device embodying the method provides a request for an engine shut off or engine start and any additional conditions of the engine start stop device are met.

After the vehicle stops, the driver brake pedal force is sampled frequently, for example, 100 to 500 times per second. The driver brake pedal force may be measured directly by a sensor which senses the force which the driver applies to the brake pedal. However, there are a number of parameters which relate to the driver brake pedal force. These parameters may be measured as a substitute for driver brake pedal force. The distance which the pedal travels in making a stop is a measure of the driver brake pedal force, because a high driver brake pedal force on the pedal will cause more pedal travel. Thus, pedal travel distance may be used as a measure of the driver brake pedal force. The brake pedal of a vehicle has a certain range of travel. This can vary between vehicles, but is constant for all vehicles of the same model. Frequently, a vehicle can be stopped without having the brake pedal move through its full range of travel. The percentage of the full travel range that the brake pedal travels in a given stop can be used as a measure of driver brake pedal force.

The position of the brake pedal can be a measure of driver brake pedal force, because the position of the brake pedal will vary depending upon the driver brake pedal force. The position of the brake pedal may be determined using brake pedal position sensors such as the ACDelco 13579088 brake pedal position sensor. The driver brake pedal force may be determined by measuring the pressure in the hydraulic brake line. This measurement should be made at or before the master cylinder, and before the antilock brake system (ABS).

The signal from the brake force sensor, or the substitute sensor, is measured repeatedly after the vehicle has stopped. In one embodiment the brake pedal force is the brake force sensor. The brake pedal force measurements are passed through two filters. One of the two filters is a fast filter. The fast filter provides a fast filter output which reflects the recent force applied to the brake pedal. The other filter is a slow filter. The slow filter provides a slow filter output which reflects the force applied to the brake pedal over a longer period of time than that measured by the fast filter. The slow filter output is subtracted from the fast filter output to generate a total filter output. When the force on the brake pedal is increasing, the total filter output is positive. The size of the total filter output depends upon the rate of change in the force applied to the brake pedal. When the brake pedal force is decreasing, the total filter output is negative and the size of the total filter output depends upon the rate of change in the force applied to the brake pedal. When all the following conditions are met:
   (a) the vehicle is stopped,
   (b) the force applied to the brake pedal exceeds a minimum brake pedal force threshold,
   (c) the force applied to the brake pedal is less than the maximum brake pedal force threshold at the time when the vehicle speed reaches zero, and
   (d) the total filter output 7 is positive and exceeds a threshold.
The change in driver brake pedal force is interpreted as a driver request to shut off the engine.

When the vehicle has stopped and the engine has been shut off, if either or both of the following conditions are met:
   (a) the force applied to the brake pedal falls below the minimum brake pedal force threshold, or
   (b) the total filter output is negative and below a threshold,
The change in driver brake pedal force is interpreted as a driver request to restart the engine.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
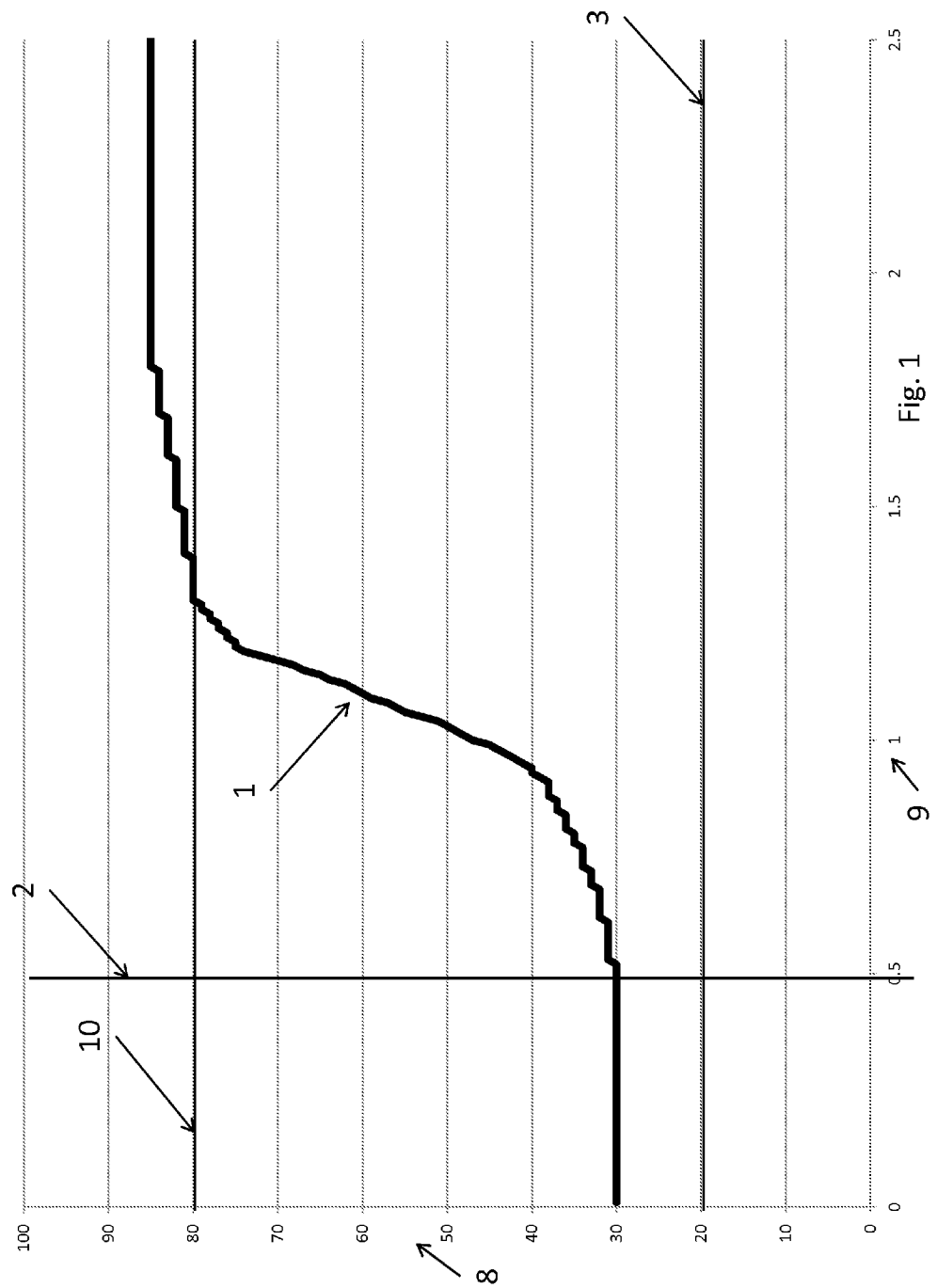
FIG. 1 shows a graph of driver brake pedal force in which the driver brake pedal force increases after the vehicle has stopped.

FIG. 1 shows a graph of driver brake pedal force in which the driver brake pedal force increases after the vehicle has stopped. When the vehicle has stopped at line 2, the driver brake pedal force 1 exceeds the minimum brake pedal force threshold 3, that is the minimum brake force required to stop the vehicle on a level surface and is less than the maximum brake pedal force threshold 10, that is the maximum brake pedal force which a driver is likely to put on the brake pedal in a nonpanic stop on a level surface. After the vehicle has stopped at line 2, the driver brake pedal force 1 increases beyond the maximum brake pedal force threshold 10. The vertical axis of the graph 8 is brake force normalized to a linear scale from 0 to 100, and the horizontal axis 9 is the time in seconds.

Figure 2:
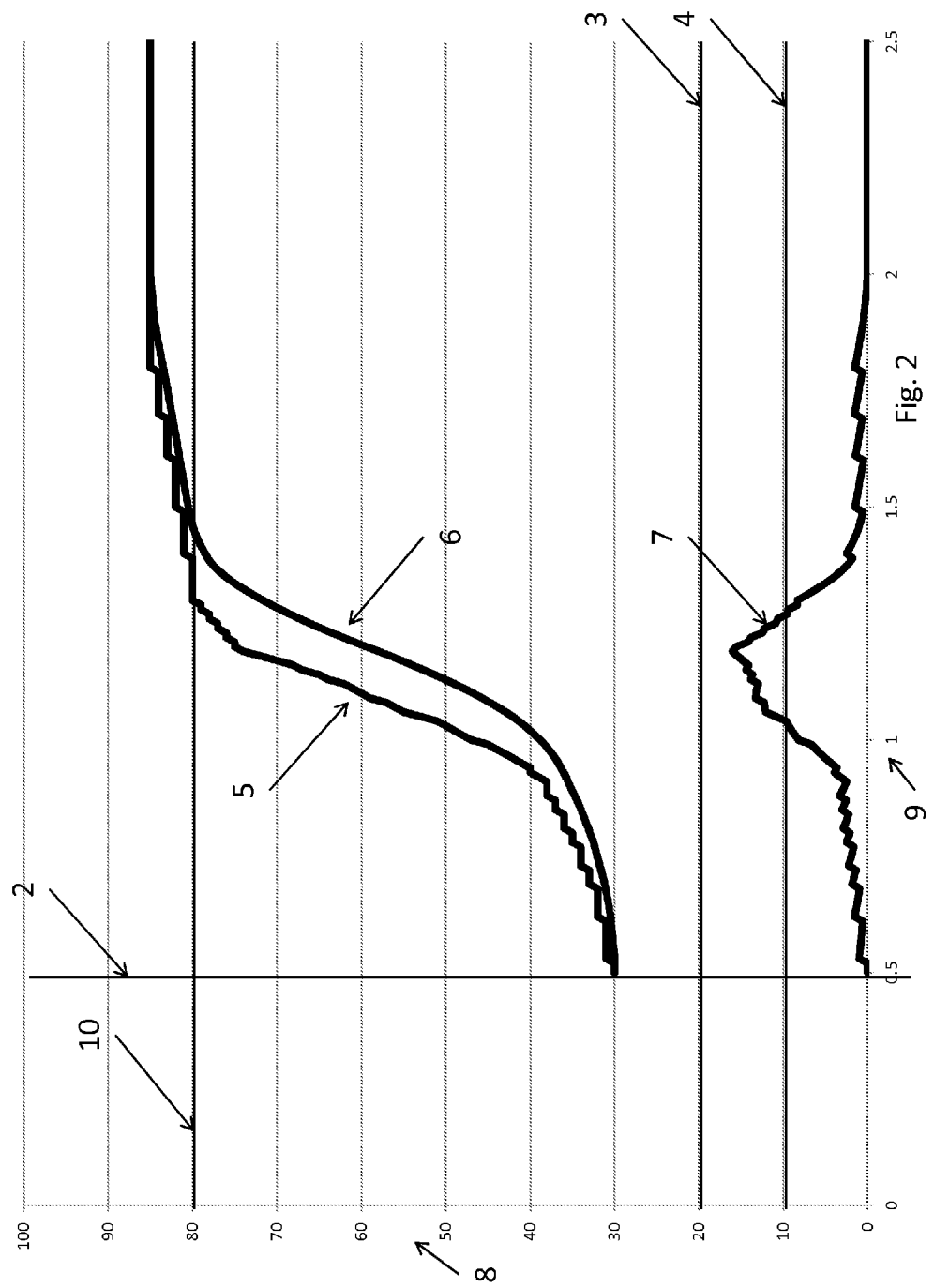
FIG. 2 shows a graph of the output of the fast filter, the output of the slow filter, and the total filter output, after the vehicle has stopped, for the driver brake pedal force change shown in FIG. 1.

FIG. 2 shows a graph of the output 5 of the fast filter, the output 6 of the slow filter, and the total filter output 7, for the driver brake pedal force change shown in FIG. 1. When the vehicle has stopped at line 2, the driver brake pedal force 1 exceeds the minimum brake pedal force threshold 3 and is less than the maximum brake pedal force threshold 10. After the vehicle stops at 2, the driver brake pedal force 1 is increasing. The output 5 of the fast filter is larger than the output 6 of the slow filter. The total filter output 7 is above the difference threshold 4, and, therefore, the increase in driver brake pedal force is a request for engine shut off. The vertical axis of the graph 8 is brake force normalized to a linear scale from 0 to 100, and the horizontal axis 9 is the time in seconds.

Figure 3:
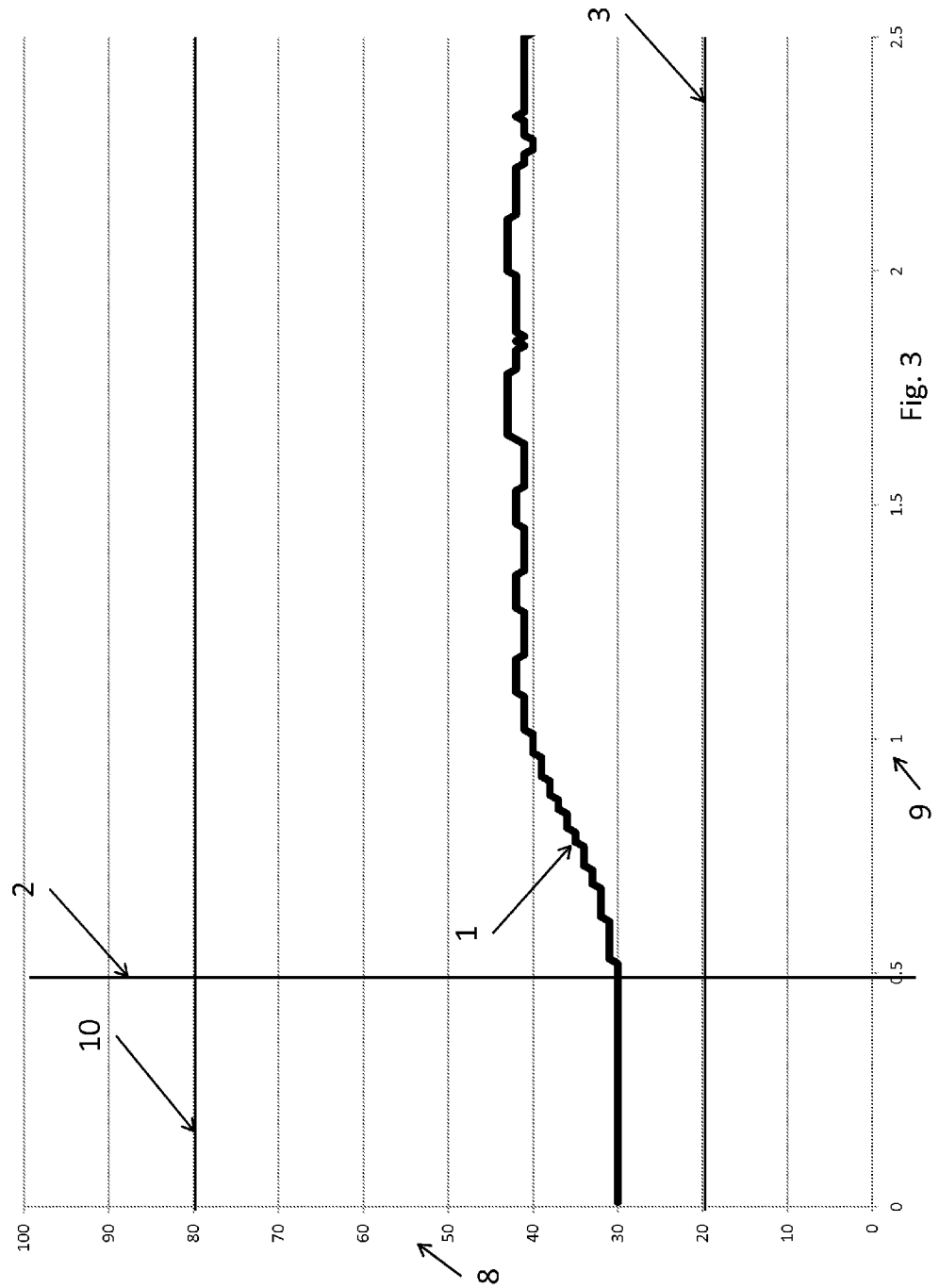
FIG. 3 shows a graph of driver brake pedal force in which the driver brake pedal force increases slowly after the vehicle has stopped.

FIG. 3 shows a graph of driver brake pedal force in which the driver brake pedal force increases slowly after the vehicle has stopped. When the vehicle has stopped at line 2, the driver brake pedal force 1 exceeds the minimum brake pedal force threshold 3 and is less than the maximum brake pedal force threshold 10. After the vehicle has stopped at line 2 the driver brake pedal force 1 increases slowly and then stabilizes. The vertical axis of the graph 8 is brake force normalized to a linear scale from 0 to 100, and the horizontal axis 9 is the time in seconds.

Figure 4:
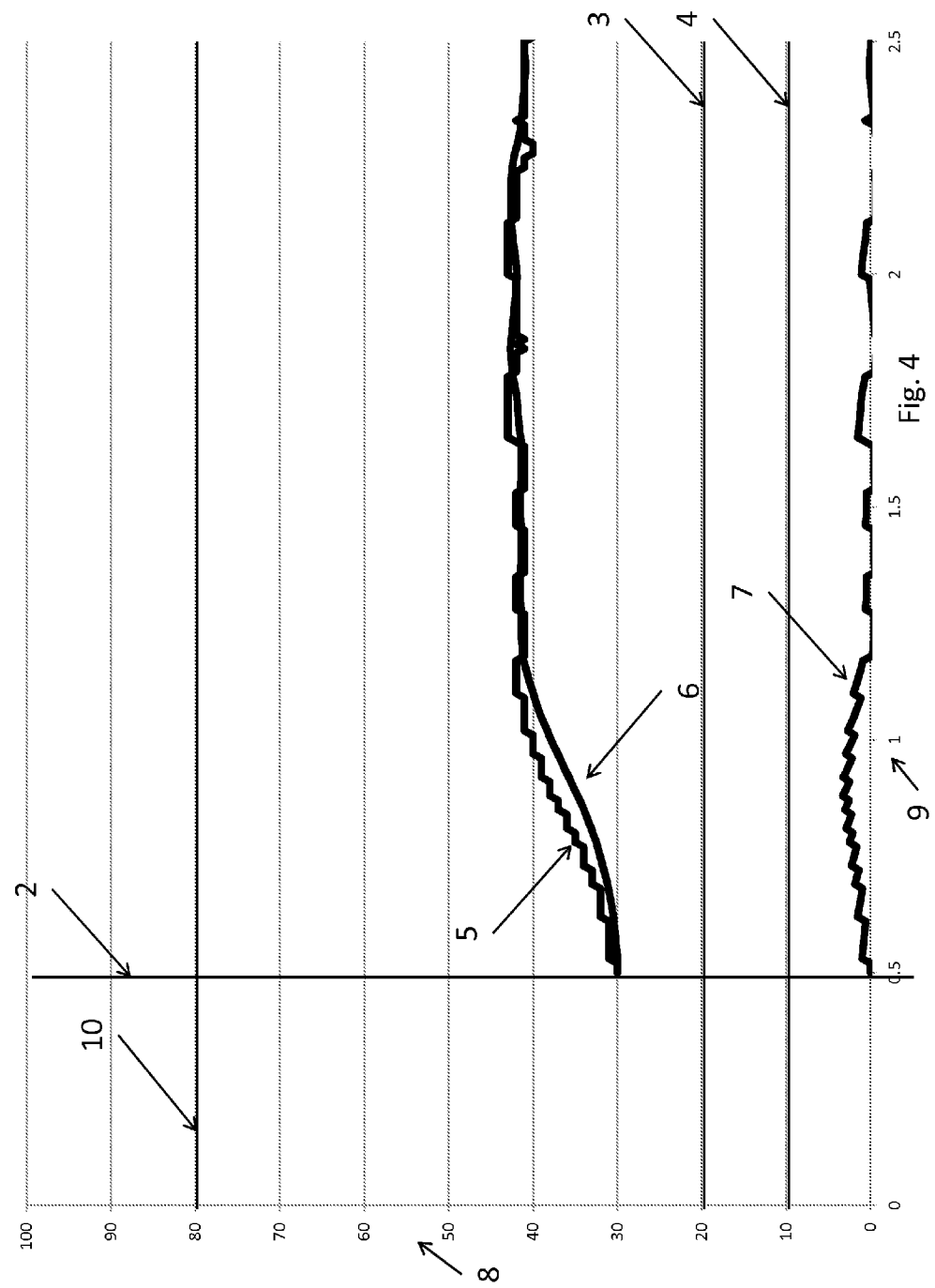
FIG. 4 shows a graph of the output of the fast filter, the output of the slow filter, and the total filter output, after the vehicle has stopped, for the driver brake pedal force change shown in FIG. 3.

FIG. 4 shows a graph of the output 5 of the fast filter, the output 6 of the slow filter, and the total filter output 7, after the vehicle stopped, for the driver brake pedal force change shown in FIG. 3. When the vehicle has stopped at line 2, the driver brake pedal force 1 exceeds the minimum brake pedal force threshold 3 and is less than the maximum brake pedal force threshold 10. After the vehicle stops at 2, the driver brake pedal force 1 is increasing slowly. The output 5 of the fast filter is a larger than the output 6 of the slow filter. The total filter output 7 is below the difference threshold 4, and therefore the increase in driver brake pedal force is not a request for engine shut off. The vertical axis of the graph 8 is brake force normalized to a linear scale from 0 to 100, and the horizontal axis 9 is the time in seconds.

Figure 5:
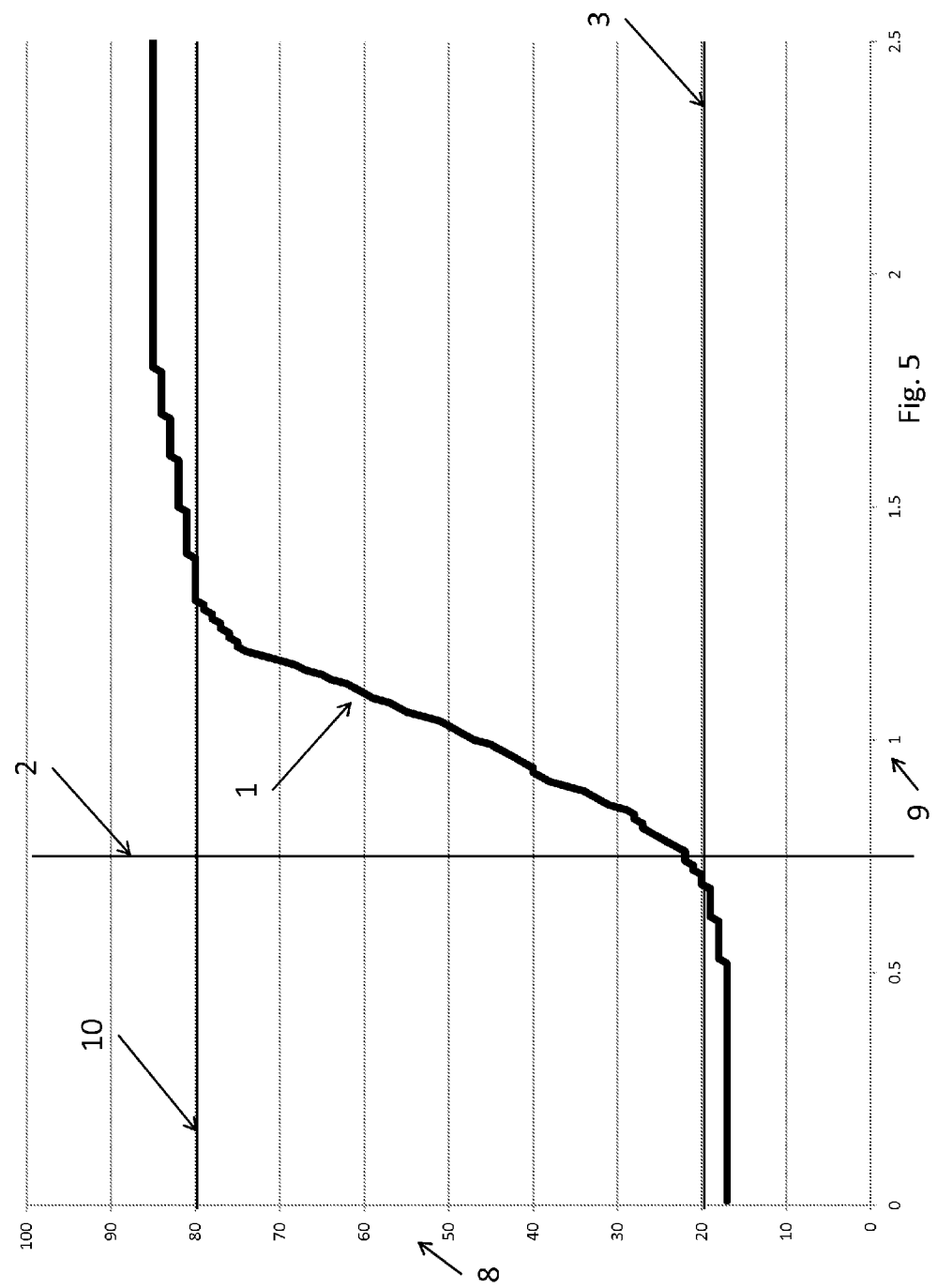
FIG. 5 shows a graph of driver brake pedal force in which the driver brake pedal force increases after the vehicle has stopped on a flat surface.

FIG. 5 shows a graph of driver brake pedal force in which the driver brake pedal force increases after the vehicle has stopped on a flat surface. When the vehicle has stopped at line 2, the driver brake pedal force 1 exceeds the minimum brake pedal force threshold 3 and is less than the maximum brake pedal force threshold 10. After the vehicle stops at 2, the driver brake pedal force 1 increases above the maximum brake pedal force threshold 10. The vertical axis of the graph 8 is brake force normalized to a linear scale from 0 to 100, and the horizontal axis 9 is the time in seconds.

Figure 6:
FIG. 6 shows a graph of the output of the fast filter, the output of the slow filter, and the total filter output, after the vehicle has stopped, for the driver brake pedal force change shown in FIG. 5.

FIG. 6 shows a graph of the output 5 of the fast filter, the output 6 of the slow filter, and the total filter output 7 after the vehicle has stopped, for the driver brake pedal force change shown in FIG. 5. When the vehicle has stopped at line 2, the driver brake pedal force 1 exceeds the minimum brake pedal force threshold 3 and is less than the maximum brake pedal force threshold 10. After the vehicle stops at 2, the driver brake pedal force 1 increases above the maximum brake pedal force threshold 10. The fast filter output 5 exceeds the slow filter output 6. The total filter output 7 is above the difference threshold 4, and therefore, the increase in driver brake pedal force 1 is a request for engine shut off. The vertical axis of the graph 8 is brake force normalized to a linear scale from 0 to 100, and the horizontal axis 9 is the time in seconds.

Figure 7:
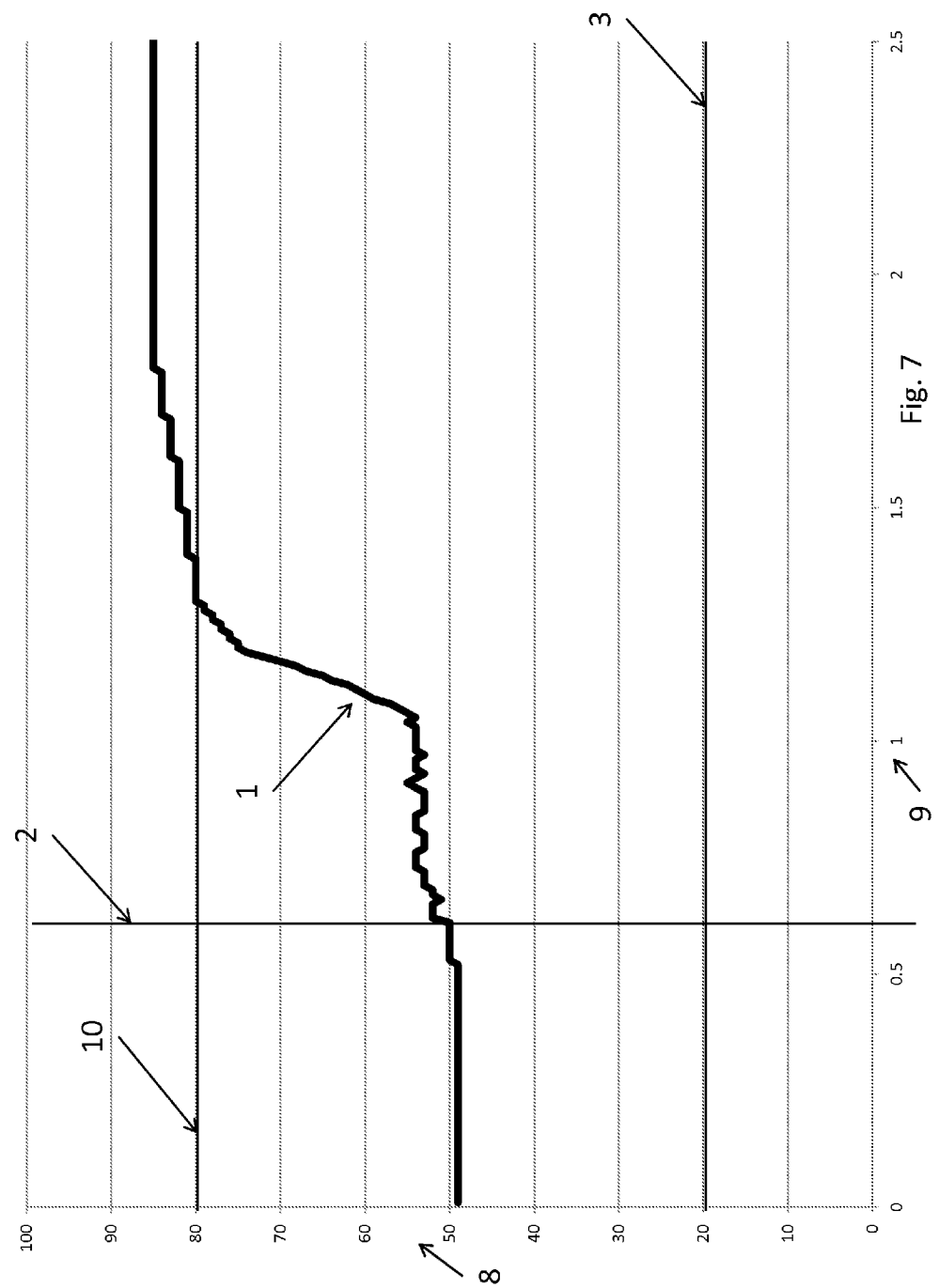
FIG. 7 shows a graph of driver brake pedal force in which the driver brake pedal force increases after the vehicle has stopped. The vehicle is stopped pointing down an incline.

FIG. 7 shows a graph of driver brake pedal force in which the driver brake pedal force increases after the vehicle has stopped. The vehicle is stopped pointing down an incline, and accordingly the brake pedal force 1 required to keep the vehicle from moving exceeds the minimum brake pedal force threshold. When the vehicle has stopped at line 2, the driver brake pedal force 1 exceeds the minimum brake pedal force threshold 3 and is less than the maximum brake pedal force threshold 10. After the vehicle stops at 2, the driver brake pedal force 1 increases above the maximum brake pedal force threshold 10. The vertical axis of the graph 8 is brake force normalized to a linear scale from 0 to 100, and the horizontal axis 9 is the time in seconds.

Figure 8:
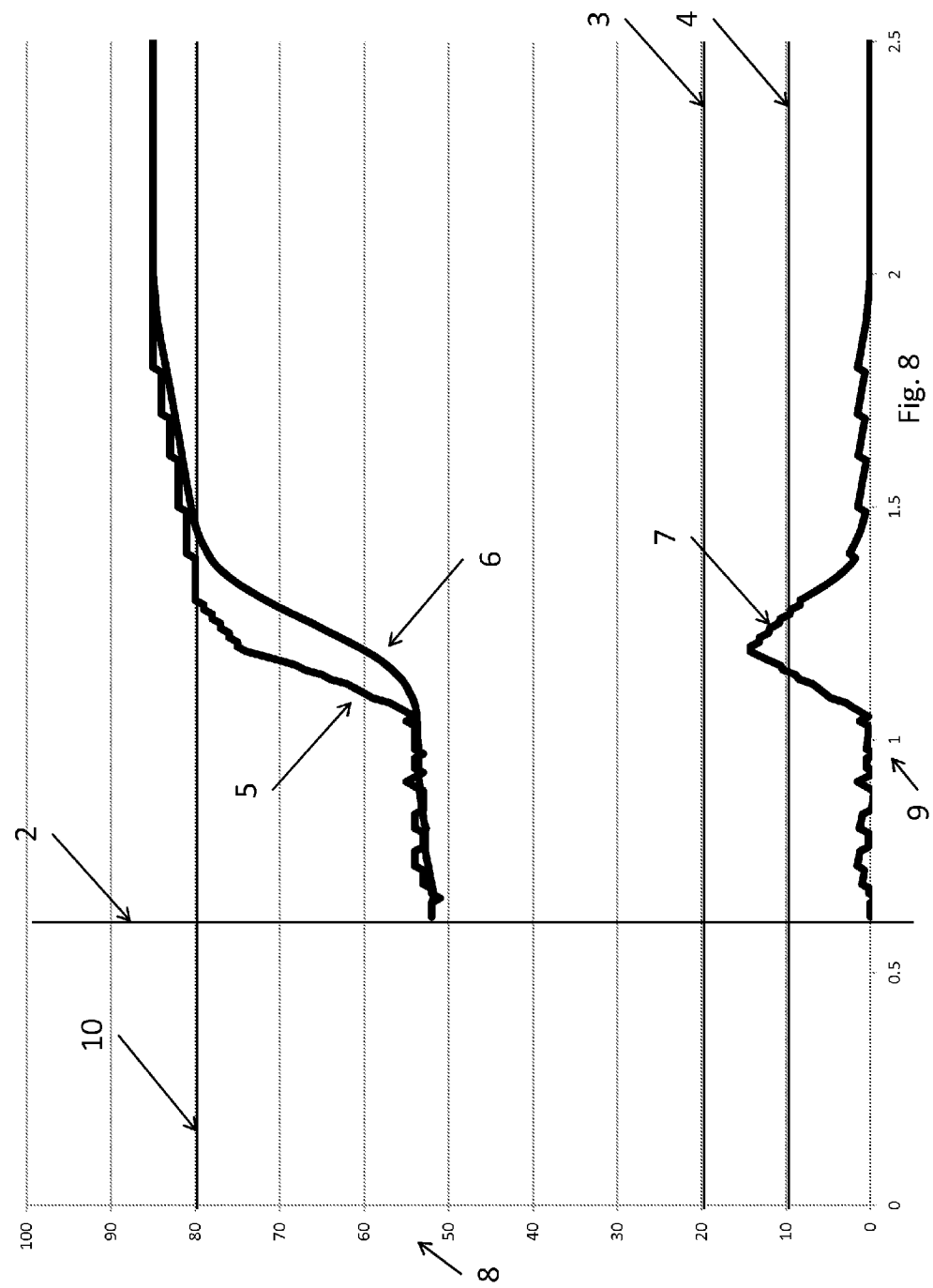
FIG. 8 shows a graph of the output of the fast filter, the output of the slow filter, and the total filter output, after the vehicle has stopped, for the driver brake pedal force change shown in FIG. 7.

FIG. 8 shows a graph of the output 5 of the fast filter, the output 6 of the slow filter, and the total filter output 7, after the vehicle has stopped, for the driver brake pedal force change shown in FIG. 7. When the vehicle has stopped at line 2, the driver brake pedal force 1 exceeds the minimum brake pedal force threshold 3 and is less than the maximum brake pedal force threshold 10. The output 5 of the fast filter is larger output 6 of the slow filter. The total filter output 7 is above the difference threshold 4, and therefore the increase in driver brake pedal force is a request for engine shut off. The vertical axis of the graph 8 is brake force normalized to a linear scale from 0 to 100, and the horizontal axis 9 is the time in seconds.

Figure 9:
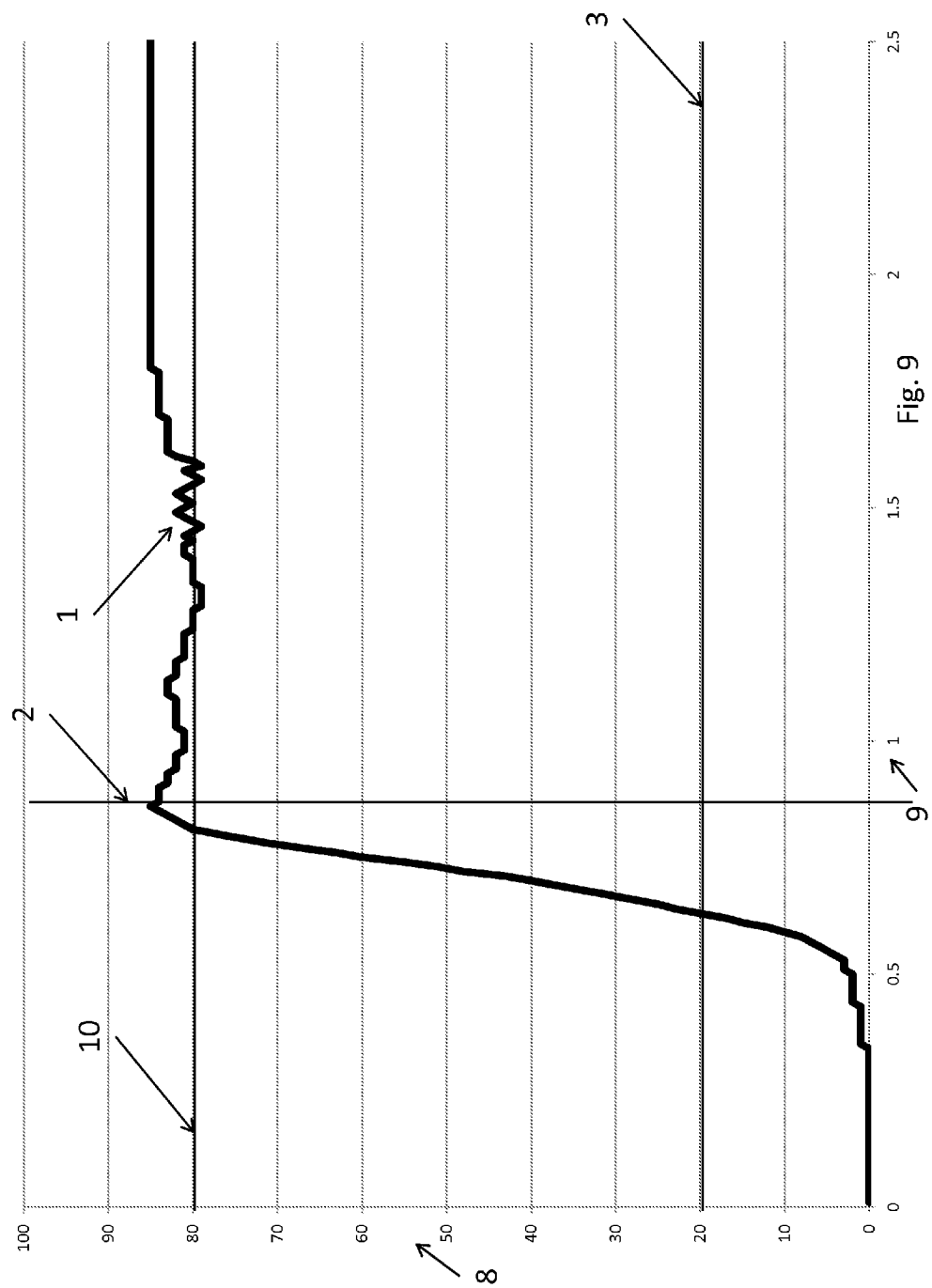
FIG. 9 shows a graph of driver brake pedal force in a panic stop.

FIG. 9 shows a graph of driver brake pedal force in a panic stop. The driver brake pedal force 1 begins below the minimum brake threshold 3 and during the stop goes above the maximum brake pedal force threshold 10. When the vehicle has stopped at line 2, the driver brake pedal force 1 exceeds the minimum brake pedal force threshold 3 and exceeds the maximum brake pedal force threshold 10. After the vehicle stops at 2, the driver brake pedal force 1 does not increase. This is not a request for an engine shut off. The vertical axis of the graph 8 is brake force normalized to a linear scale from 0 to 100, and the horizontal axis 9 is the time in seconds.

Figure 10:
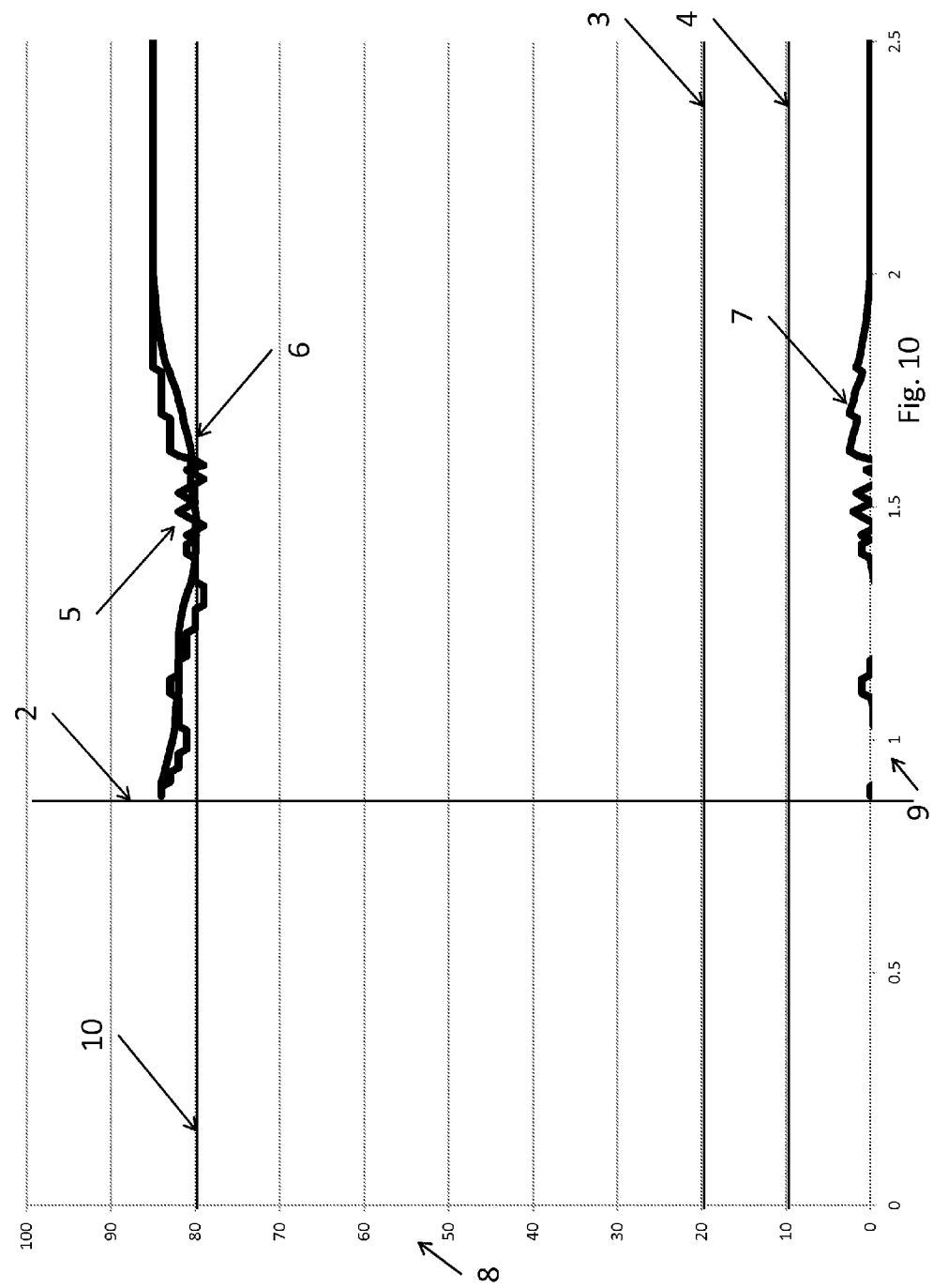
FIG. 10 shows a graph of the output of the fast filter, the output of the slow filter, and the total filter output, after the vehicle has stopped, for the driver brake pedal force change shown in FIG. 9.

FIG. 10 shows a graph of the output 5 of the fast filter, the output 6 of the slow filter, and the total filter output 7, after the vehicle has stopped, for the driver brake pedal force change shown in FIG. 9. When the vehicle has stopped at line 2, the driver brake pedal force 1 exceeds the minimum brake pedal force threshold 3 and exceeds the maximum brake pedal force threshold 10. After the vehicle stops at 2, the driver brake pedal force 1 does not increase. The output 5 of the fast filter is approximately the same as the output 6 slow filter 6. The total filter output 7 is not above the difference threshold 4, and therefore the change in driver brake pedal force is not a request for engine shut off. The vertical axis of the graph 8 is brake force normalized to a linear scale from 0 to 100, and the horizontal axis 9 is the time in seconds.

Figure 11:
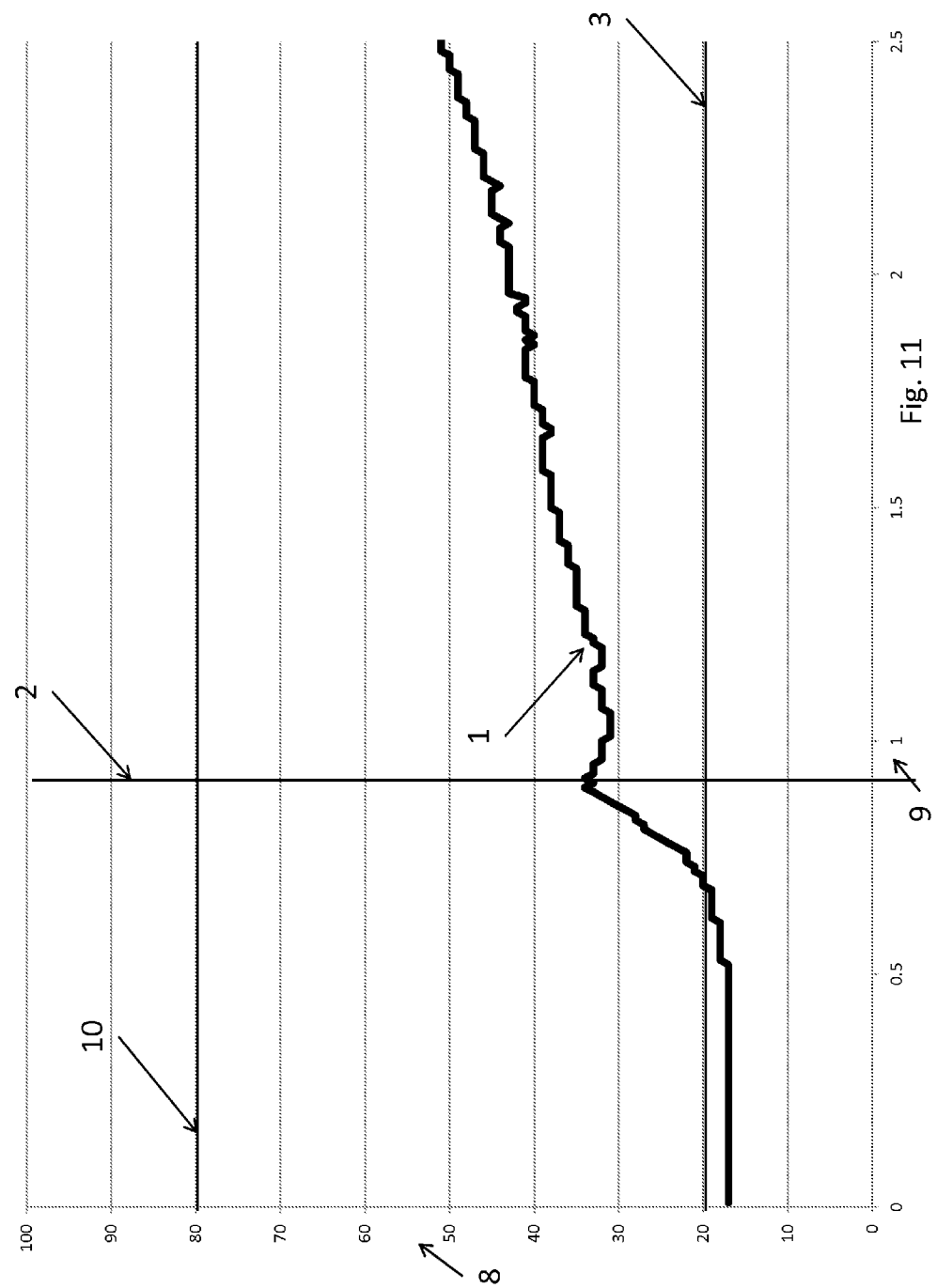
FIG. 11 shows a graph of driver brake pedal force in which the driver brake pedal force increases slowly after the vehicle has stopped.

FIG. 11 shows a graph of driver brake pedal force in which the driver brake pedal force 1 increases slowly after the vehicle has stopped. When the vehicle has stopped at line 2, the driver brake pedal force 1 exceeds the minimum brake pedal force threshold 3 and is less than the maximum brake pedal force threshold 10. The driver brake pedal force 1 does not exceed the maximum brake pedal force threshold 10. The vertical axis of the graph 8 is brake force normalized to a linear scale from 0 to 100, and the horizontal axis 9 is the time in seconds.

Figure 12:
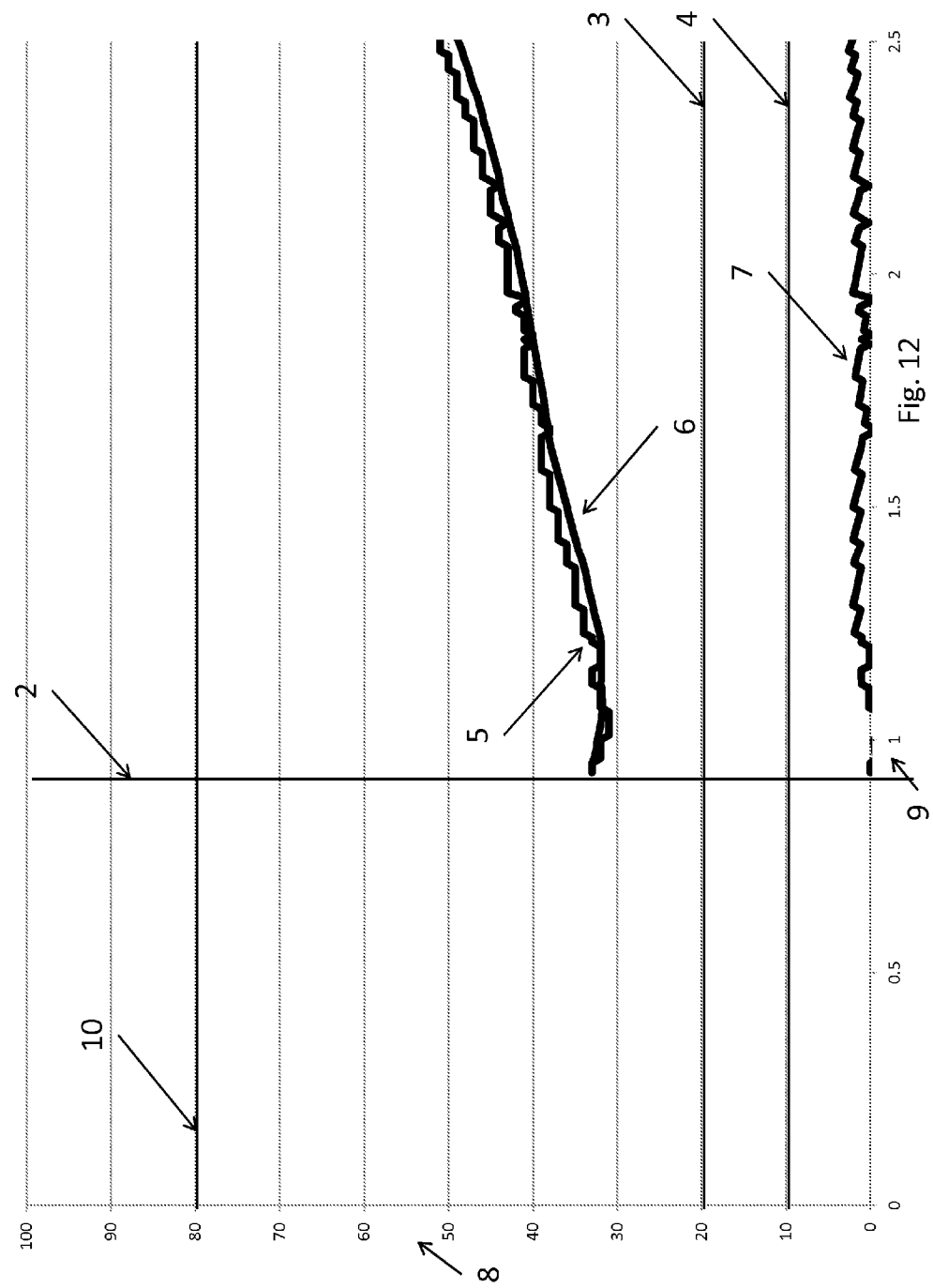
FIG. 12 shows a graph of the output of the fast filter, the output of the slow filter, and the total filter output, after the vehicle has stopped, for the driver brake pedal force change shown in FIG. 11.

FIG. 12 shows a graph of the output 5 of the fast filter, the output 6 of the slow filter, and the total filter output 7, after the vehicle has stopped, for the driver brake pedal force change shown in FIG. 11. When the vehicle has stopped at line 2, the driver brake pedal force 1 exceeds the minimum brake pedal force threshold 3 and is less than the maximum brake pedal force threshold 10. After the vehicle stops at 2, the driver brake pedal force 1 increases slowly. The output 5 of the fast filter is approximately the same as the output 6 of the as the slow filter. The total filter output 7 is not above the difference threshold 4, and therefore the change in driver brake pedal force is not a request for engine shut off. The vertical axis of the graph 8 is brake force normalized to a linear scale from 0 to 100, and the horizontal axis 9 is the time in seconds.

Figure 13:
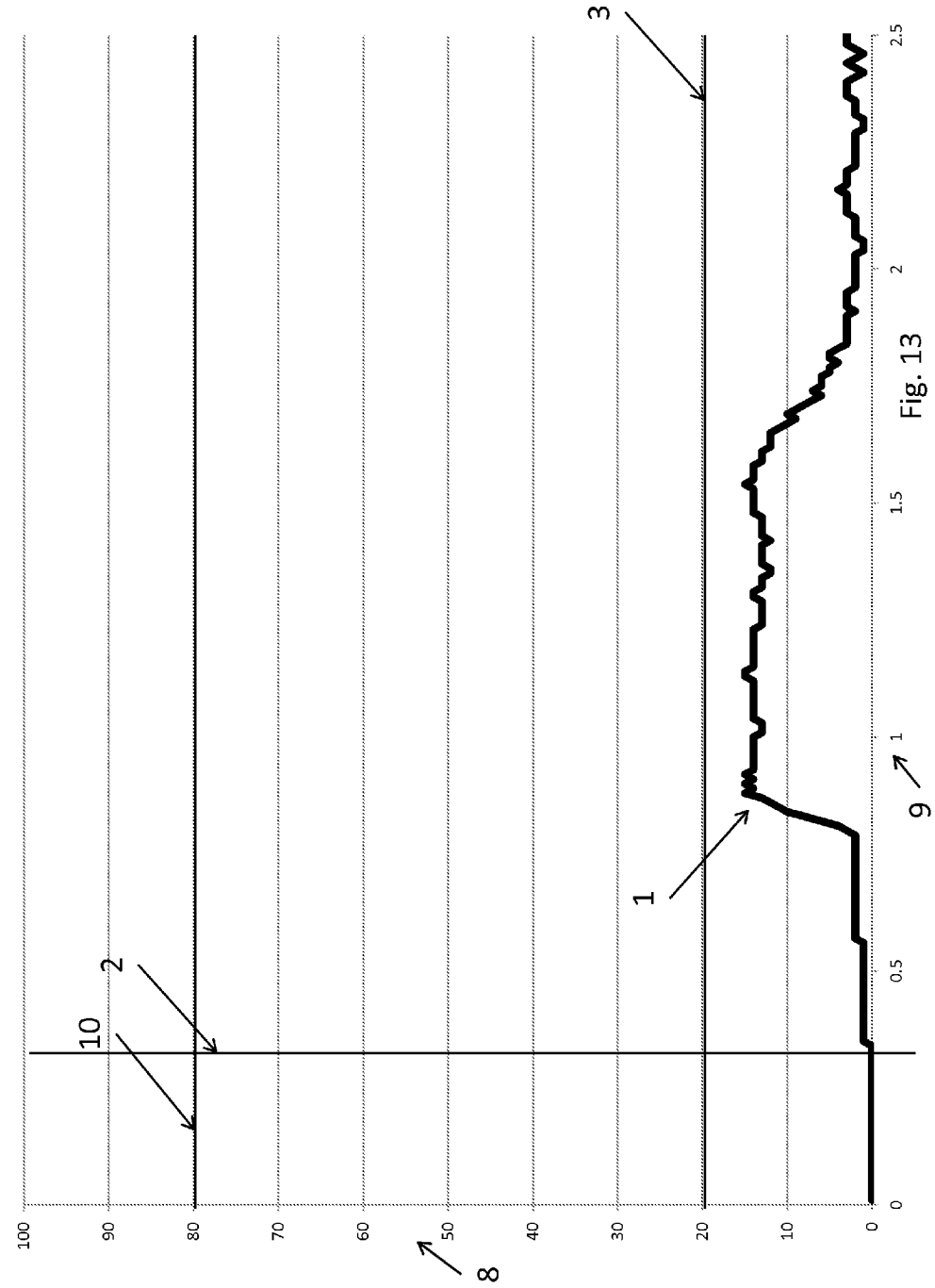
FIG. 13 shows a graph of driver brake pedal force for a vehicle stopped on an incline, facing up the incline.

FIG. 13 shows a graph of driver brake pedal force 1 for a vehicle stopped pointing up an incline. The driver brake pedal force 1 is below the minimum brake pedal force threshold 3.

Figure 14:
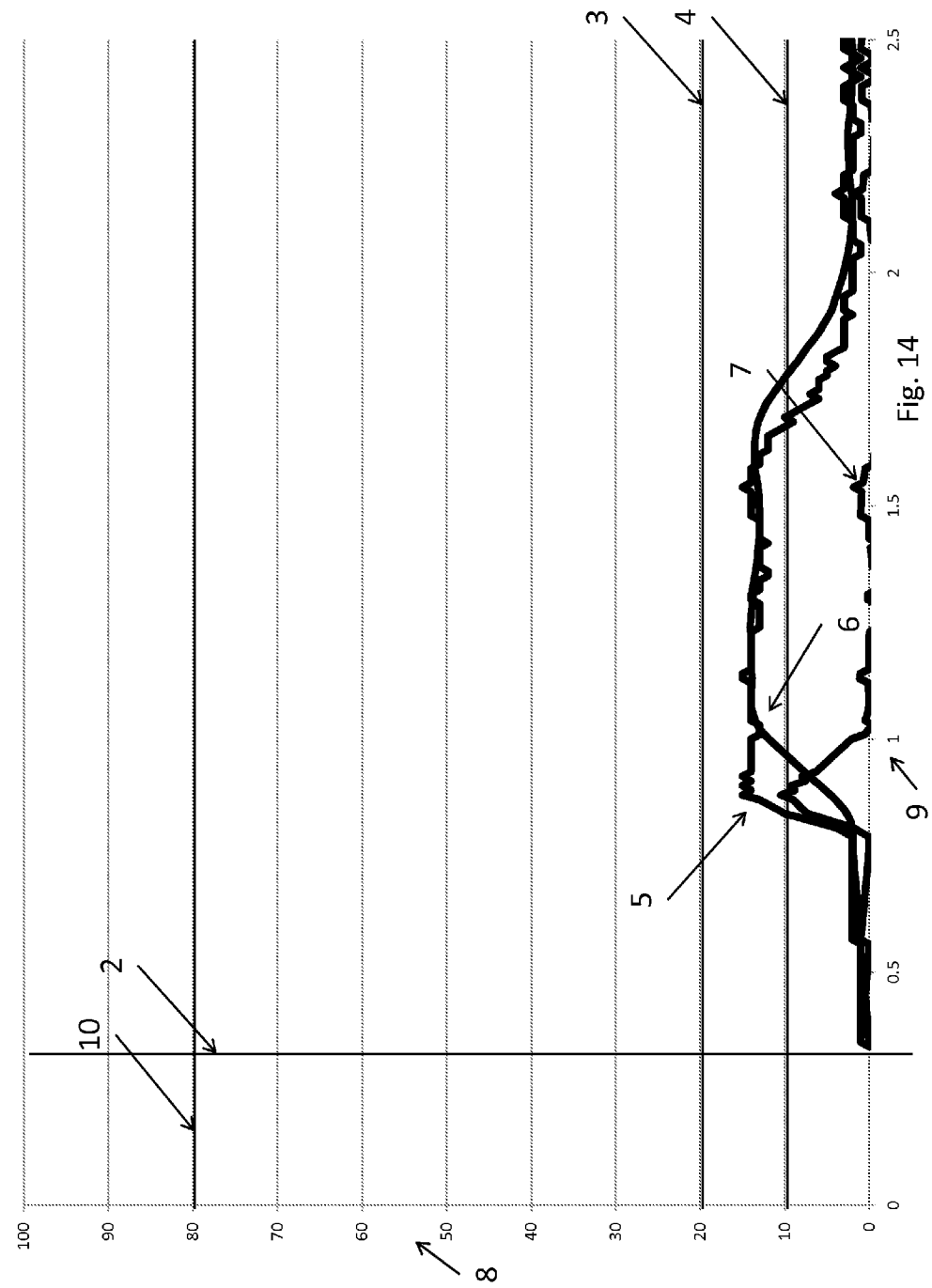
FIG. 14 shows a graph of the output of the fast filter, the output of the slow filter, and the total filter output, after the vehicle has stopped, for the driver brake pedal force change shown in FIG. 13.

FIG. 14 shows a graph of the output 5 of the fast filter, the output 6 of the slow filter, and the total filter output 7 for the driver brake pedal force change shown in FIG. 13. When the vehicle has stopped at line 2, the driver brake pedal force 1 is less than the minimum brake pedal force threshold 3, and is less than the maximum brake pedal force threshold 10. After the vehicle stops at 2, the driver brake pedal force 1 increases. The output 5 of the fast filter is larger than the output 6 of the slow filter. The total filter output 7 is larger than the difference threshold 4. However, because the driver brake pedal force 1 is not above the minimum brake pedal force threshold 3, the change in driver brake pedal force is not a request for engine shut off. The vertical axis of the graph 8 is brake force normalized to a linear scale from 0 to 100, and the horizontal axis 9 is the time in seconds.

Figure 15:
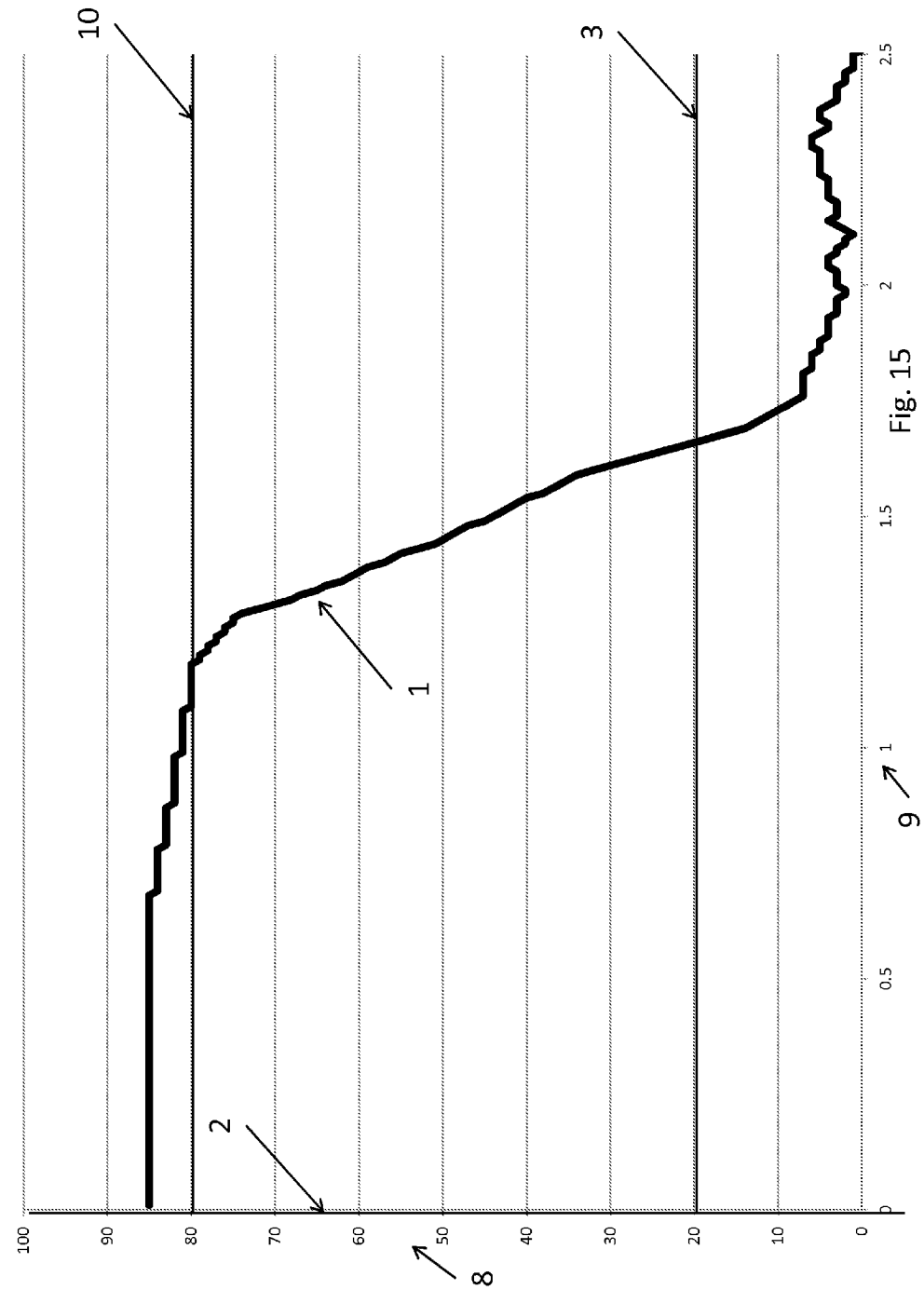
FIG. 15 shows a graph of driver brake pedal force in which the vehicle is stopped and the driver brake pedal force decreases after the vehicle has stopped.

FIG. 15 shows a graph of driver brake pedal force 1 in which the vehicle is stopped and the driver brake pedal force 1 decreases after the vehicle has stopped. When the vehicle has stopped at line 2, the driver brake pedal force 1 exceeds the minimum brake pedal force threshold 3, and exceeds the maximum brake pedal force threshold 10. After the vehicle stops at 2, the driver brake pedal force 1 decreases. The driver brake pedal force 1 then drops below the maximum brake pedal force threshold 10 and continues to drop below the minimum brake pedal force threshold 3. The vertical axis of the graph 8 is brake force normalized to a linear scale from 0 to 100, and the horizontal axis 9 is the time in seconds.

Figure 16:
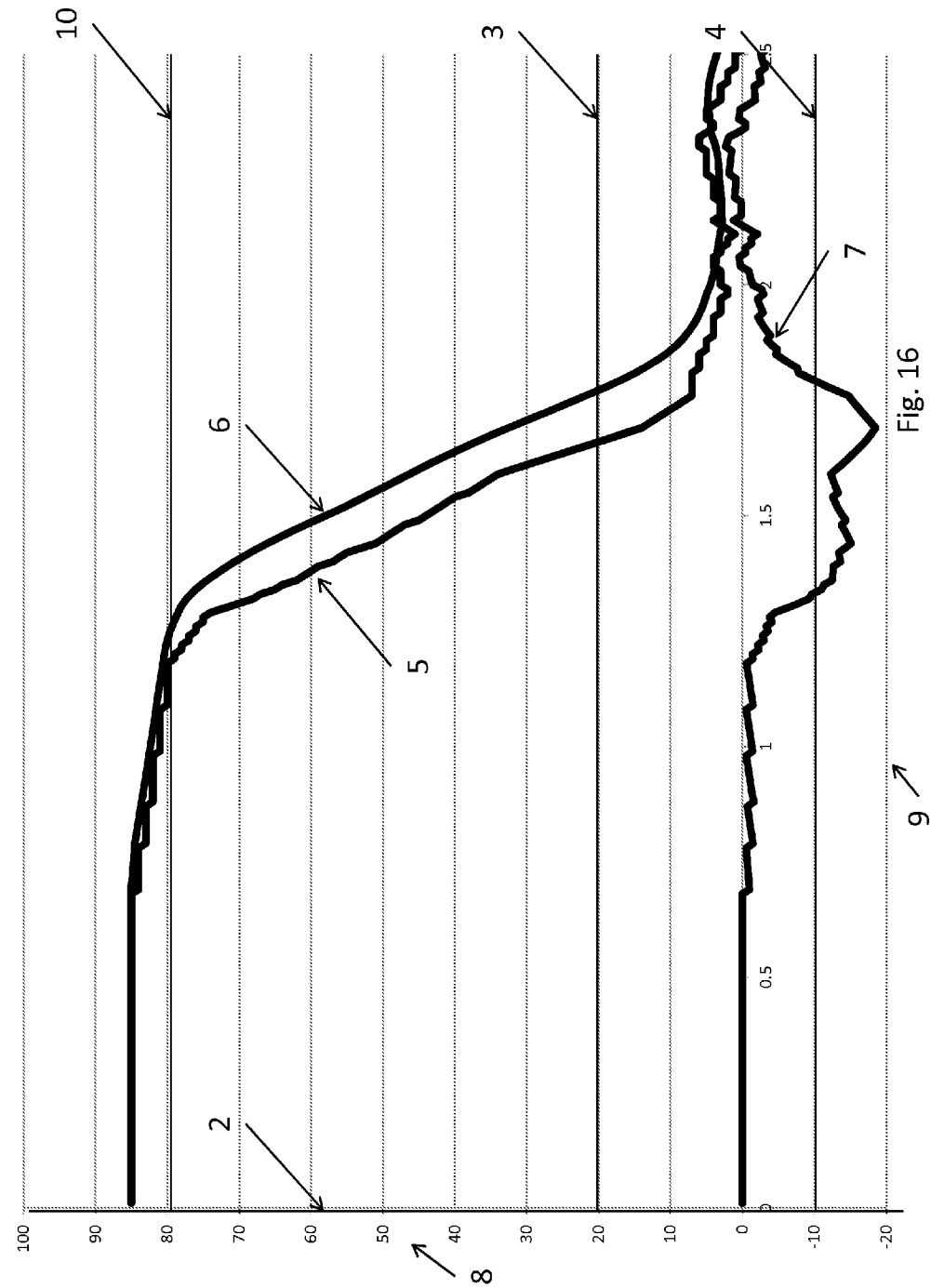
FIG. 16 shows a graph of the output of the fast filter, the output of the slow filter and the total filter output after the vehicle has stopped, for the driver brake pedal force change shown in FIG. 15.

FIG. 16 shows a graph of the output 5 of the fast filter, the output 6 of the slow filter, and the total filter output for the driver brake pedal force 1 change shown in FIG. 15. When the vehicle has stopped at line 2, the driver brake pedal force 1 exceeds the minimum brake pedal force threshold 3 and exceeds the maximum brake pedal force threshold 10. After the vehicle stops at 2, the driver brake pedal force 1 decreases. The driver brake pedal force decreases below the minimum brake pedal force threshold 3. As the driver brake pedal force deceases, the output 5 of the fast filter is less than the output 6 of the slow filter. The total filter output 7 is negative and below the difference threshold 4, and therefore the decrease in driver brake pedal force is a request for engine restart. The vertical axis of the graph 8 is brake force normalized to a linear scale from 0 to 100, and the horizontal axis 9 is the time in seconds.

Figure 17:
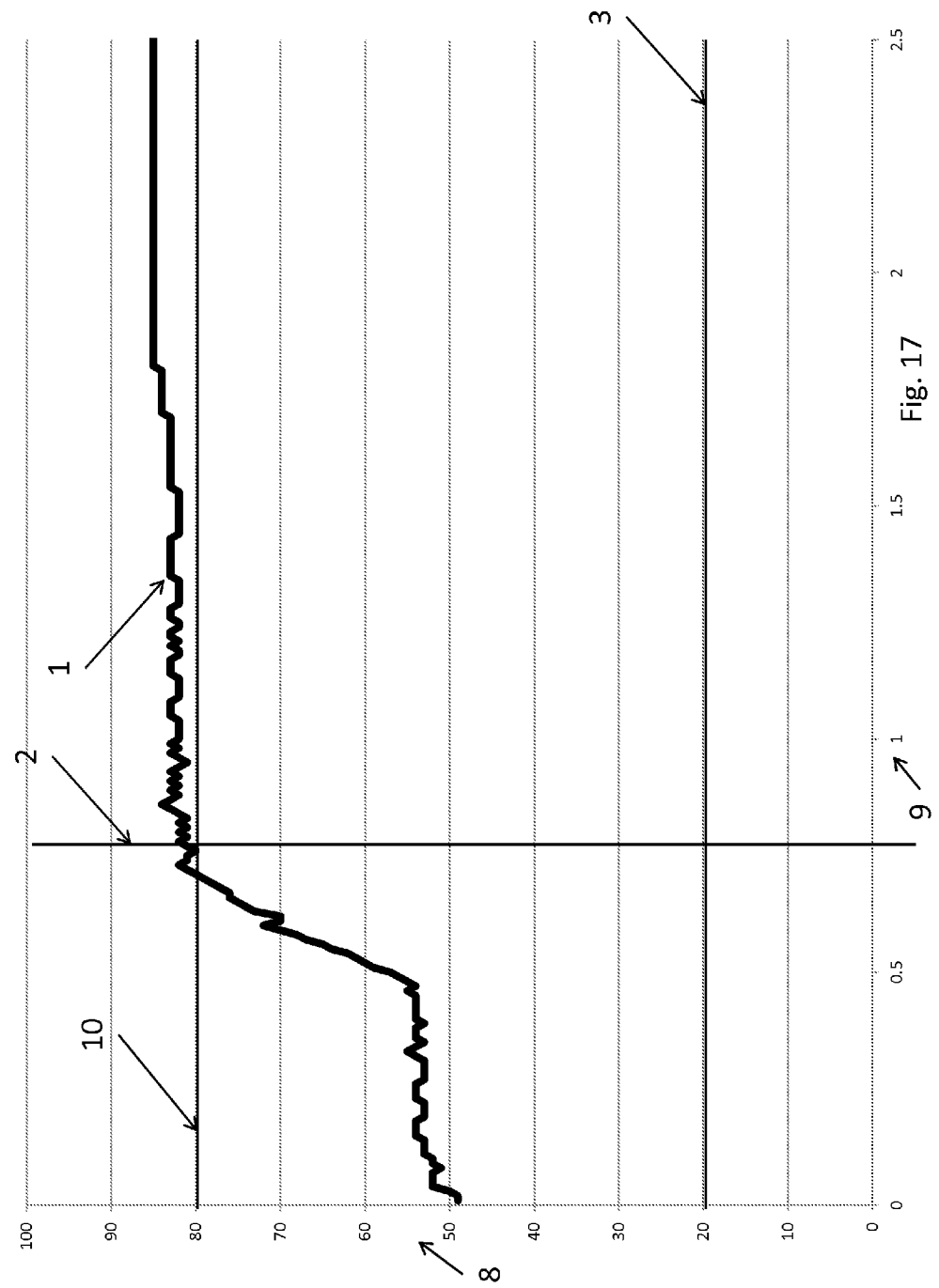
FIG. 17 shows a graph of driver brake pedal force in which the vehicle is stopping on a steep incline, facing down the incline.

FIG. 17 shows a graph of driver brake pedal force in which the vehicle stops facing down an incline. When the vehicle has stopped at line 2, the driver brake pedal force 1 exceeds the minimum brake pedal force threshold 3 and exceeds the maximum brake pedal force threshold 10. After the vehicle stops at 2, the driver brake pedal force 1 does not increase.

Figure 18:
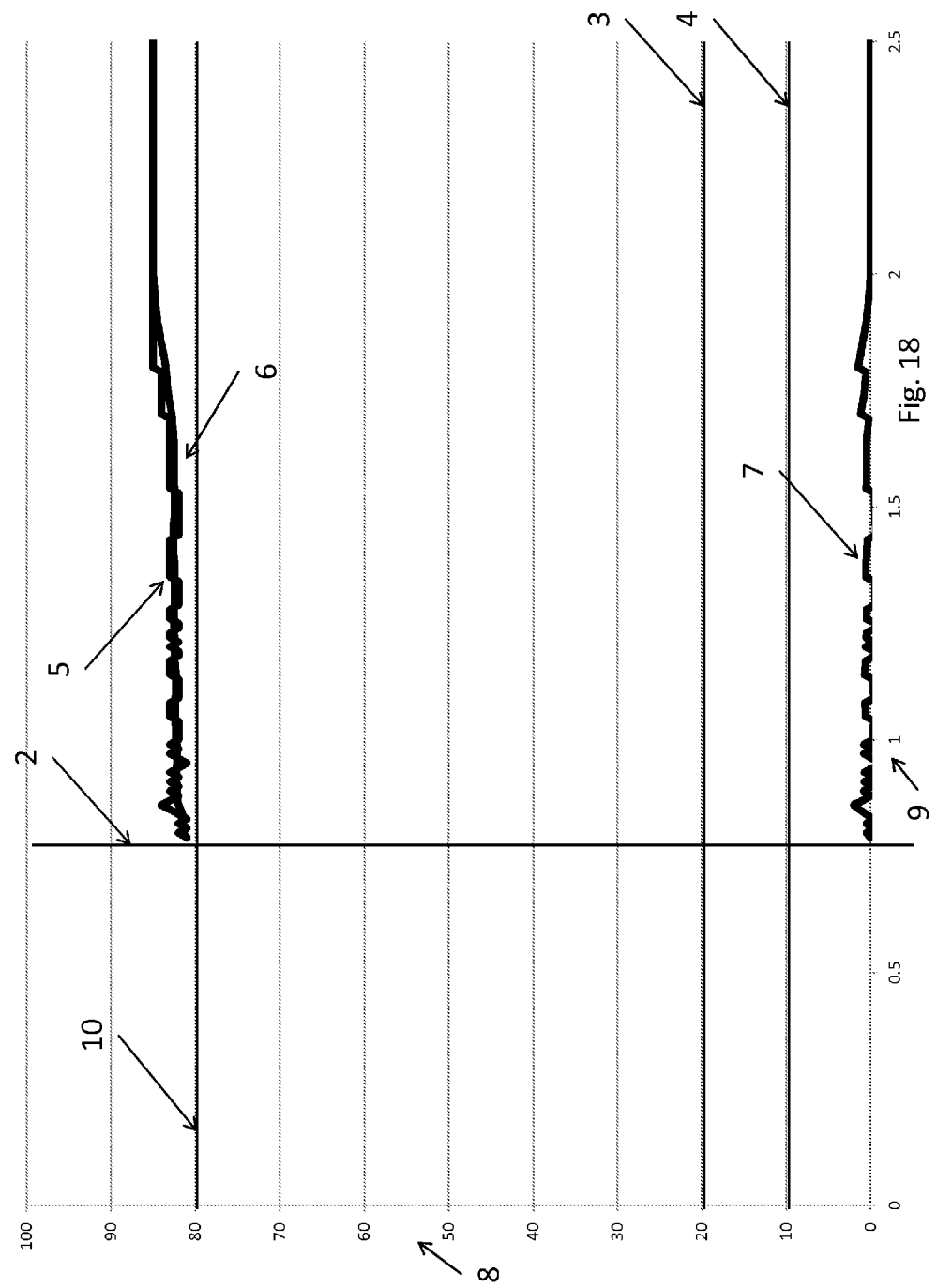
FIG. 18 shows a graph of the output of the fast filter, the output of the slow filter, and the total filter output, after the vehicle has stopped, for the driver brake pedal force change shown in FIG. 17.

FIG. 18 shows a graph of the output 5 of the fast filter, the output 6 of the slow filter, and the total filter output 7, after the vehicle stops, for the driver brake pedal force change shown in FIG. 17. When the vehicle has stopped at line 2, the driver brake pedal force 1 exceeds the minimum brake pedal force threshold 3 and exceeds the maximum brake pedal force threshold 10. After the vehicle stops at 2, the driver brake pedal force 1 does not increase. The output 5 of the fast filter, and the output 6 of the slow filter are almost identical and the total filter output 7 does not exceed the difference threshold 4. This is not a request for an engine shutoff.

Figure 19:
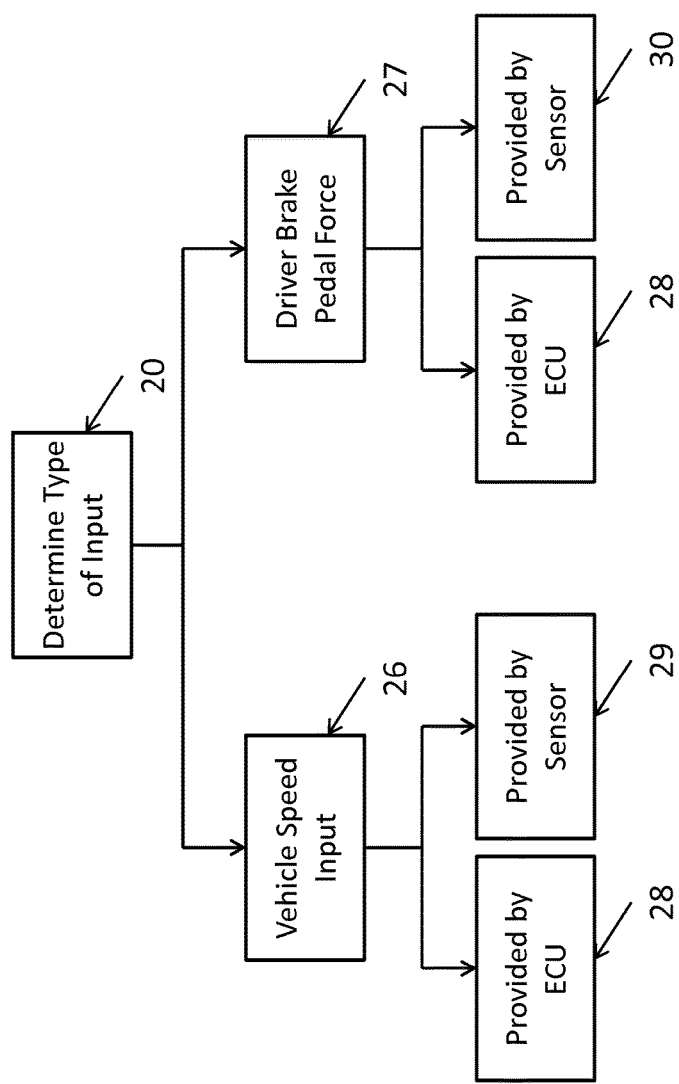
FIG. 19 shows a block diagram of the operation of a device embodying the present invention in determining what type of data it will obtain.

FIG. 19 shows a block diagram of the operation of a device embodying the present invention in determining what type of data it will obtain.

Figure 20:
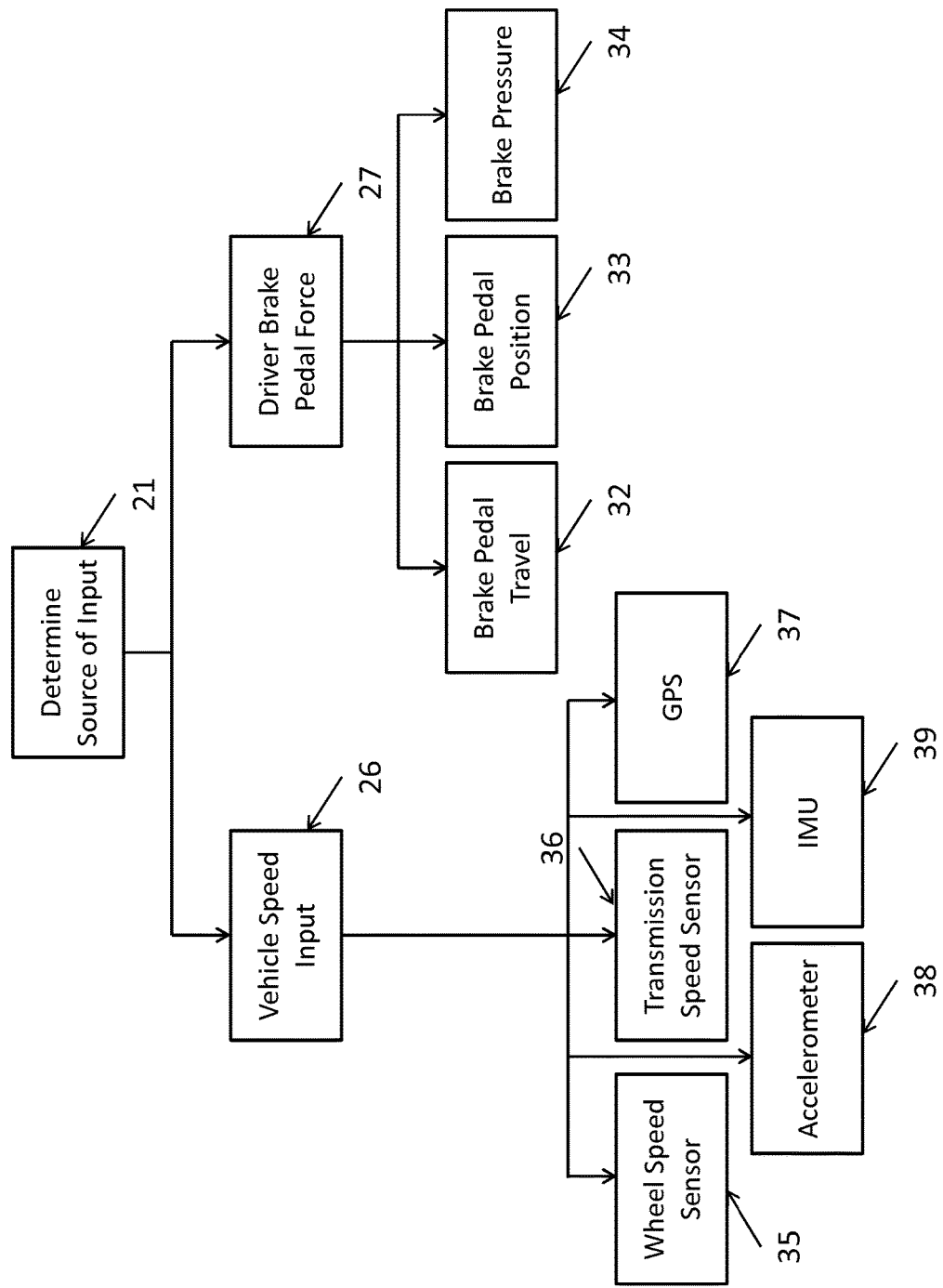
FIG. 20 shows a block diagram of the operation of a device embodying the present invention in determining where it will obtain data.

FIG. 20 shows a block diagram of the operation of a device embodying the present invention to stop or start an engine in response to increases or decreases in driver brake pedal force in determining where it will obtain data. The device 21 may receive signals from a variety of speed sensors, including a vehicle wheel speed sensor 35, a transmission speed sensor 36, an accelerometer 38, a GPS 37, or an inertial measurement system (IMU) 39. The device 21 may receive signals from a variety of brake sensors such as a brake pedal travel sensor 32, a brake pedal position sensor 33, and a brake force sensor 34.

Figure 21:
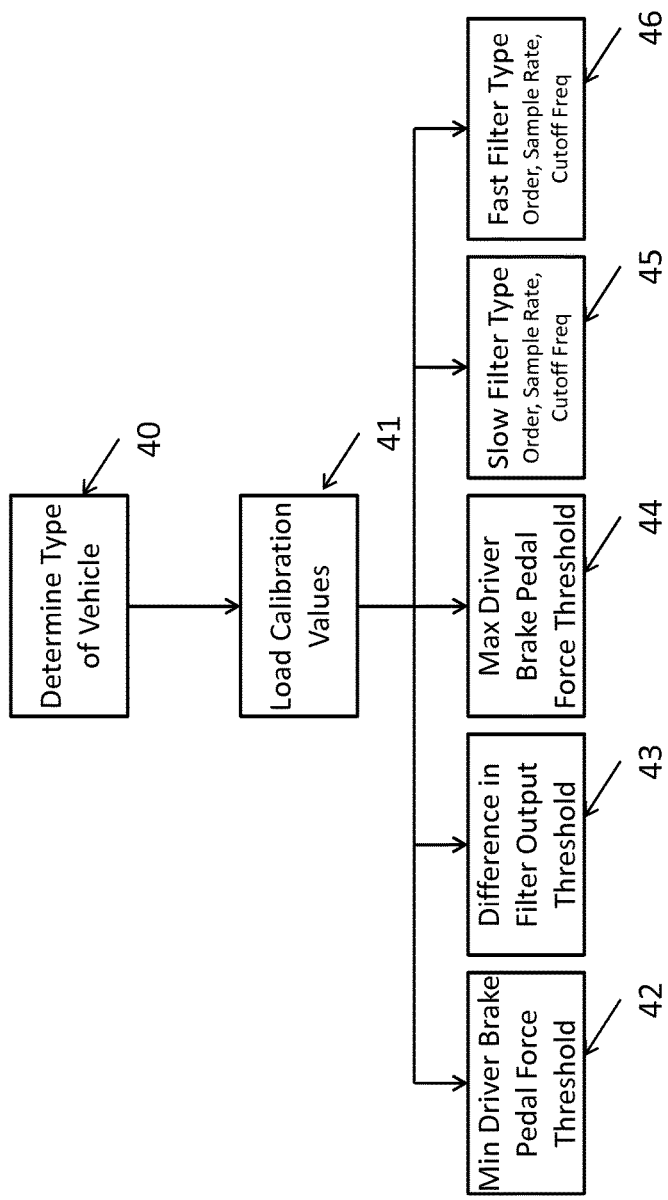
FIG. 21 shows a block diagram of the operation of a device embodying the present invention in determining vehicle type and loading calibration values.

FIG. 21 shows a block diagram of the operation of a device embodying the present invention to stop or start an engine in response to increases or decreases in driver brake pedal force in determining vehicle type and loading calibration values.

Figure 22:
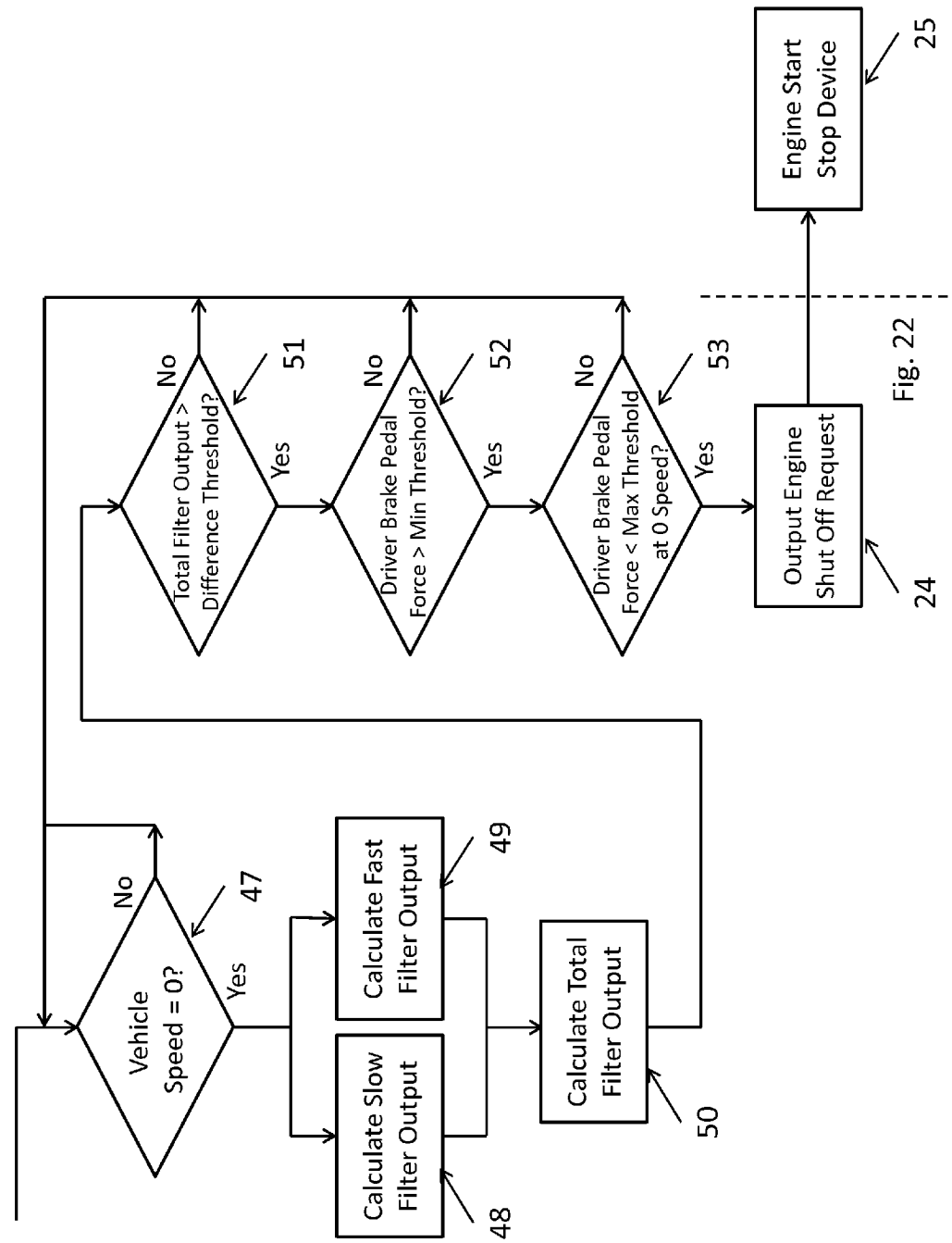
FIG. 22 shows a block diagram of the operation of a device embodying the present invention in issuing an engine shut off request.

FIG. 22 shows a block diagram of the operation of a device embodying the present invention in issuing an engine shut off request. The device checks 47 to determine if the vehicle speed equals 0. If the vehicle speed is not zero, the device branches back and checks the vehicle speed again to 47. If the vehicle speed equals zero, the device calculates a slow filter output 48, a fast filter output 49, and a total filter output 50. The total filter output is compared to a difference threshold 51. If the total filter output 50 is not greater than a difference threshold 51, the device branches back to 47. If the total filter output is greater than a difference threshold 51, the device checks if the driver brake pedal force is greater than a minimum threshold 52. If the driver brake pedal force is not greater than a minimum threshold 52, the device branches back to 47 and checks if the vehicle speed equals zero. If the driver brake pedal force is greater than a minimum threshold 52, the device checks if the driver brake pedal force is less than a maximum threshold 53. If driver brake pedal force is not less than a maximum threshold 53, the device branches back to 47 and checks if the vehicle speed equals zero. If the driver brake pedal force is less than a maximum threshold 53, the device issues an engine shut off request.

Figure 23:
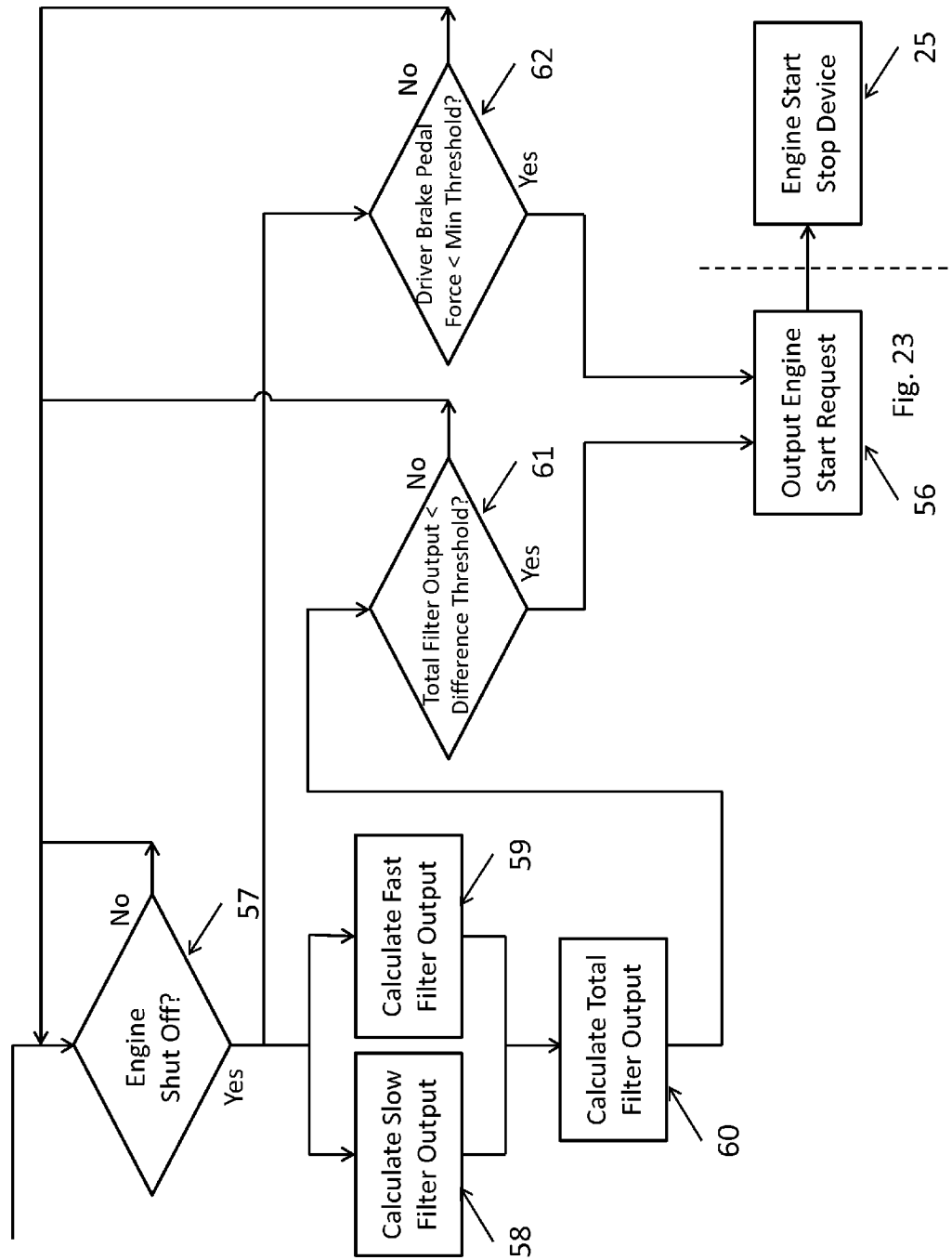
FIG. 23 shows a block diagram of the operation of a device embodying the present invention to issue an engine start request.

FIG. 23 shows a block diagram of the operation of a device embodying the present invention to issue an engine start request. The device checks if the engine is shut off 57. If the engine is not shut off, the device rechecks whether the engine is shut off 57. If the engine is shut off 57, the device calculates a slow filter output 58, a fast filter output 59, and a total filter output 60. The device also determines if the driver brake pedal force is less than a minimum threshold. If the driver brake pedal force is not less than a minimum threshold, the device branches back to 57 and checks if the vehicle speed equals zero. The total filter output is compared to a difference threshold 61. If the total filter output is not less than a difference threshold 61, the device branches back to 57. If the total filter output is less than a difference threshold 61, or the driver brake pedal force is less than a minimum threshold 62, the device outputs an engine start request.

Figure 24:
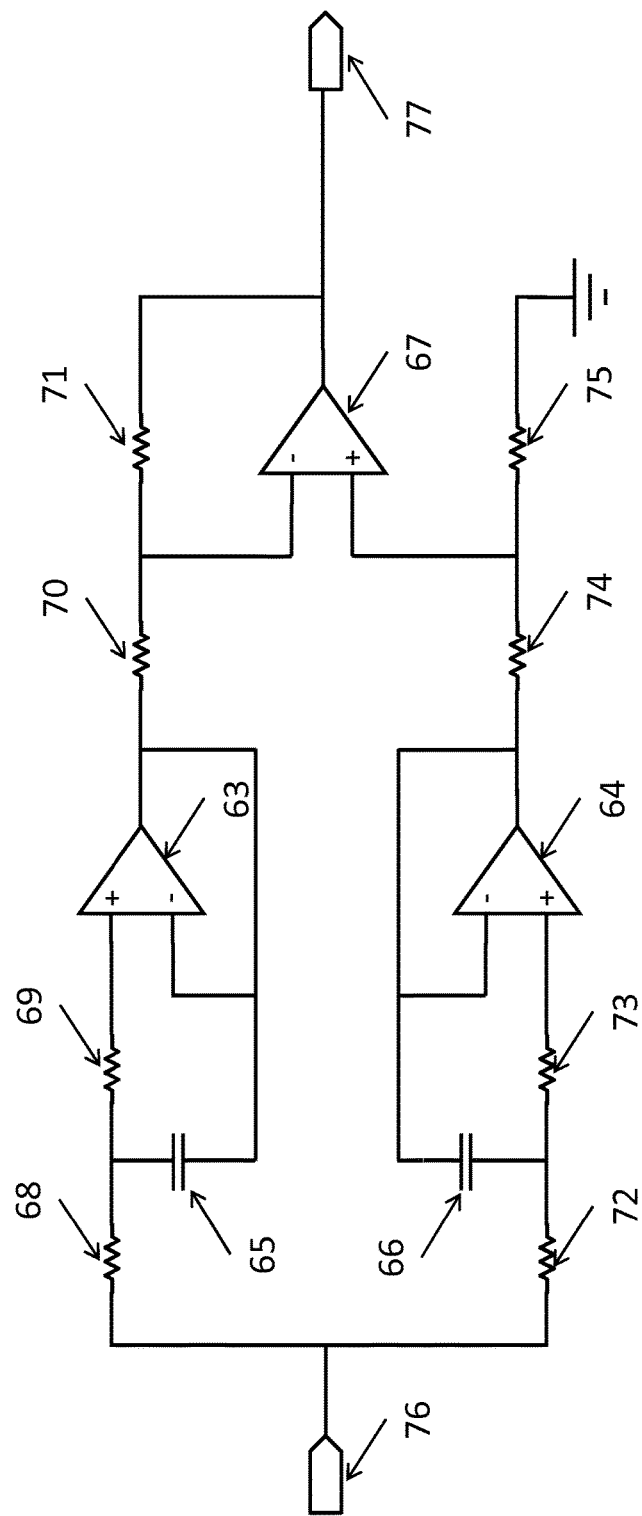
FIG. 24 shows a schematic of a fast low pass first order Butterworth filter, a slow low pass first order Butterworth filter, and a differential amplifier useful in a device embodying the present invention.

FIG. 24 shows a schematic of two low pass filters and a differential amplifier according to the present invention. 63, 64, and 67 are operational amplifiers. 68, 69, 70, 71, 72, 73, 74, and 75 are resistors. 65 and 66 are capacitors. In this implementation, the driver brake pedal force, 76 measurement signal is first input into a slow analog low pass filter and a fast analog low pass filter.

Operational amplifier 63, resistors 68 and 69, and capacitor 65 comprise the slow analog low pass filter. This slow analog low pass filter is arranged in a first order Butterworth configuration. The values of resistors 68 and 69, and capacitor 65 are chosen to provide a cut off frequency of 4-40 Hz to produce a slow filter output. The values of resistors 68 and 69 are chosen to provide a high input impedance, to prevent modification to the driver brake pedal force measurement input signal, 76. Resistance values of 10 kiloohms to 1 megaohms are convenient for these resistors. Operational amplifier 63 is a Texas Instruments TL343 Single Low Power Operational Amplifier.

Operational amplifier 64, resistors 72 and 73, and capacitor 66 comprise the fast analog low pass filter. This fast analog low pass filter is arranged in a first order Butterworth configuration. The values of resistors 72 and 73 and capacitor 66, are chosen to provide a cut off frequency of 50-500 Hz to produce a fast filter output. The values of resistors 72 and 73 are chosen to provide a high input impedance to prevent modification to the driver brake pedal force measurement input signal, 76. Resistance values of 10 kiloohms to 1 megaohms are convenient for these resistors. Operational amplifier 64 is a Texas Instruments TL343 Single Low Power Operational Amplifier.

Operational amplifier 67 and resistors 70, 71, 74, and 75 comprise the differential amplifier. The slow filter output enters the negative input of operational amplifier 67 through resistor 70. The fast filter output enters the positive input of the operation amplifier 67 through resistor 74. The output 77 of the operational amplifier 67 is the total filter output 77, that is, the slow filter output subtracted from the fast filter output. The values of resistors 70, 71, 74, and 75 are chosen to provide a gain of 1. Operational amplifier 67 is a Texas Instruments THS4500 High-Speed Fully Differential Amplifier. The total filter output 77 is then converted to digital form and input into the microcontroller using an analog to digital converter. Operational amplifiers 63 and 64 are low power operational amplifiers such as Texas Instruments TL343 Single Low Power Operational Amplifier. The differential amplifier 67 is a high-speed fully differential amplifier such as a Texas Instruments THS4500 High-Speed Fully Differential Amplifier.

This invention provides a computer implemented method which allows the driver to request an engine shut down by increasing force on the brake pedal and to request an engine restart by decreasing force on the brake pedal. The computer which implements the method may be operating in a device which is installed in the vehicle and communicates with an electronic control unit (ECU). Such communication can employ standard automotive electronic communication protocol such as CAN (Controller Area Network), RS232 Serial, or J1850 PWM (Pulse Width Modulation). If the computer program used in the computer implemented method is operating in a device which is installed in the vehicle, the device may get information from sensors originally in the vehicle or from additional vehicle speed sensors or brake force sensors which are installed on the vehicle. The sensors provide vehicle speed information, indicate when the vehicle had stopped, and indicate the driver brake pedal force. In some vehicles, speed information and driver brake pedal force information may be obtained from the vehicle ECU.

The computer program used in the computer implemented method may be added as a modification to the software of an existing ECU. This could be accomplished by reflashing the ECU, using commercially available hardware and software. In this case, there would be no hardware equipment required to implement the method. The embodiment in which the computer program used in the computer implemented method is simply added to the programs in an existing ECU has the advantage that it does not require installation of extra equipment in the engine compartment, and the running of wires to various sensors. Finally, the method may be embodied as a program in the ECU at the time of manufacture of the vehicle. However, these embodiments are feasible only in vehicles in which information about vehicle speed and driver brake pedal force are available at the ECU.

The computer implemented method of the present invention considers only the brake pedal force changes after the vehicle has stopped in determining whether or not to request shut off or restart the engine. After the vehicle has stopped, this invention provides a computer implemented method which allows the driver to request an engine shut down by increasing force on the brake pedal and to request an engine restart by decreasing force on the brake pedal.

A device embodying the method samples the driver brake pedal force frequently, for example 100 to 500 times per second. The variation of the brake pedal force over time provides a brake pedal force signal which is passed through a fast low pass filter with a cut off frequency between 50-500 Hz to produce a fast filter output. A filter cut off frequency of 100 Hz is a preferred value for the fast filter. The signal is also passed through a slow low pass filter with a cut off frequency of 4-40 Hz to produce a slow filter output. A cut off frequency of 10 Hz is preferred for the slow filter. The filters may be analog or digital. In addition, the slow filter and the fast filter may use rolling averages of the brake force. If the slow filter and fast filter use rolling averages, the rolling averages are calculated by a computer. If digital low pass filters are used to produce slow and fast filter outputs, the filter outputs are calculated by the computer. The computer calculates the total filter output and compares the total filter output and the brake pedal force to threshold values to determine whether or not to output an engine start or stop request.

If analog low pass filters are used to produce slow and fast filter outputs, and a differential amplifier is used to produce the total filter output, the total filter output can then converted to digital form and input into the computer. The computer compares the total filter output and the brake pedal force to threshold values to determine whether or not to output an engine start or stop request.

If the slow filter and fast filter use rolling averages, the rolling averages are calculated by a computer. If digital low pass filters are used to produce slow and fast filter outputs, the filter outputs are calculated by the computer. If analog sensors are used to produce slow and fast filter outputs, the analog outputs are converted to digital form. The computer calculates the total filter output and compares the total filter output and the brake pedal force to threshold values to determine whether or not to output an engine start or stop request.

The computer implemented method described in the invention will typically be implemented in a microcontroller that resides in the vehicle. The microcontroller capable of performing the method of the present invention can be a rather simple microcontroller. A wide variety of commercially available microcontrollers, for example, the Microchip Technology PIC 16 family of microcontrollers, may be used in the invention. The microcontroller may be added to the vehicle, or alternatively, the invention may be embodied as a computer program operating in an existing vehicle ECU.

When digital filters are used, a microcontroller should be selected which has sufficient processing capability to calculate the slow filter output, fast filter output, and total filter output. The microcontroller also should have sufficient processing capability to calculate the slow rolling average, fast rolling average, and the total filter output in the embodiment where the slow filter provides a slow rolling average as the output and the fast filter provides a fast rolling average as the output.

The microcontroller has the ability to receive input from vehicle speed sensors and driver brake pedal force sensors using analog to digital converters in embodiments in which these inputs are provided by sensors on the vehicle. The microcontroller has the ability to communicate with other ECUs on the vehicle using standard automotive electronic communication protocol such as can (controller area network), RS232 serial, or J1850 PWM (pulse width modulation) in the embodiment where these inputs are provided by the vehicle ECUs. The microcontroller has the ability to communicate an output to the engine start stop device of the driver request to shut off the engine or the driver request to start the engine.

A device embodying the present invention works in conjunction with an engine start stop device. When a device embodying the invention determines that the driver is requesting an engine stop or restart, it signals an engine start stop device which stops or restarts the engine. When the vehicle is moving, the slow digital filter output and the fast digital filter output are set to zero, thus assuring that only changes in force applied to the brake pedal, after the vehicle stops, are considered as engine stop or restart requests. Thus, a device embodying the method will not stop the engine of a vehicle during a panic stop as long as the vehicle is moving, no matter how high the force applied to the brake pedal may be or how rapid the change in brake pedal force.

In one embodiment, the slow filter is a low pass filter which provides a slow rolling average as the output. The fast filter is a low pass filter which provides a fast rolling average as the output. A slow rolling average is calculated by averaging between 15 and 50 points in a rolling average. When a new measurement of driver brake force is made, the oldest measurement of driver brake force is discarded, and the new measurement is added to the measurements to be averaged. A fast average is calculated by averaging between 2 and 10 points in a rolling average. When a new measurement of driver brake pedal force 1 is made, the oldest measurement of driver brake pedal force 1 is discarded, and the new measurement is added to the measurements to be averaged. The number of points averaged in calculating the rolling averages is not particularly critical. However, if too many points are averaged, the method will become slow. In addition, if too many points are included in the fast average, the method will become unresponsive because even a large change in driver brake pedal force 1 will not change the fast average very quickly. If the number of points averaged in the slow average is too close to the number of points averaged in the fast average, the difference between the two will be small, and the driver may not be able to put enough force on the brake to signal a request for an engine shut off. The slow average and the fast average may be calculated by a number of different averaging methods, including the arithmetic mean, the geometric mean, the harmonic mean, and a power mean such as the root mean square (RMS). The arithmetic mean is preferred because of ease of calculation.

The slow average includes more measurements than the fast average, and thus the slow average reacts more slowly to changes in driver brake pedal force 1. After the vehicle stops, the fast average and the slow average are calculated. The slow average is subtracted from the fast average. The result is the total filter output 7. The calculation of total filter output 7 is repeated 100 to 500 times per second, as long as the vehicle is stopped. When the force on the brake pedal is increasing, the total filter output 7 is positive. The size of the total filter output 7 depends upon the rate of change in the force applied to the brake force. When the force on the brake pedal is decreasing, the total filter output 7 is negative. The size of the total filter output 7 depends upon the rate of change in the force applied to the brake pedal. During the period when the vehicle is stopped, if the total filter output 7 is greater than a threshold, the force on the brake pedal exceeds the minimum brake pedal force threshold, and the force on the brake pedal is less than the maximum brake pedal force threshold at the time when the speed of the vehicle reached zero, the driver brake force change is considered to be a request to shut off the engine. During the period when the vehicle is stopped, if the total filter output 7 is less than a threshold, or the force on the brake pedal is less than the minimum brake pedal force threshold, the driver brake force change is considered to be a request to restart the engine.

Instead of processing the repeated brake force measurements by averaging them, they may be processed using electronic filters. These filters can be either digital or analog filters. The digital filters may be infinite impulse response filters such as Chebyshev filters, elliptic filters, Bessel filters, or Butterworth filters. Butterworth filters are preferred because of their smooth response. The digital filters may be finite impulse response filters. Such filters may be designed using the window design method; the weighted least squares design method, or the Parks-McClellan design method. The slow low pass filter and fast low pass filter need not be of the same type. For example, one may be an analog filter and the other could be a digital filter. Two different types of analog or two different types of digital filters may be employed. The analog filters may be active or passive filters. The active filters include Butterworth filters, Chebyshev filters, Elliptic filters, and Bessel filters. The passive filters include Butterworth filters, Chebyshev filters, Elliptic filters, and Bessel filters. Of the analog filters, the active Butterworth filters are preferred because of their smooth response.

In one embodiment, the variation of the brake pedal force over time provides a brake pedal force signal which is passed through a fast analog low pass filter with a cut off frequency between 50-500 Hz to produce a fast filter output. A filter cut off frequency of approximately 100 Hz is a preferred value for the fast filter. This filter provides an output which reflects the recent force applied to the brake pedal. The signal is also passed through a slow analog low pass filter with a cut off frequency of 4-40 Hz to produce a slow filter output. A cut off frequency of approximately 10 Hz is preferred for the slow filter. This filter provides an output which reflects the force applied to the brake pedal over a longer period of time than that measured by the fast filter.

The slow filter output is subtracted from the fast filter output to generate a total filter output 7. When the force on the brake pedal is increasing, the total filter output 7 is positive. The size of the total filter output 7 depends upon the rate of change in the force applied to the brake force. When the force on the brake pedal is decreasing, the total filter output 7 is negative. The size of the total filter output 7 depends upon the rate of change in the force applied to the brake pedal. When the force applied to the brake pedal exceeds the minimum brake pedal force threshold, the total filter output 7 is positive and exceeds a threshold, and the force on the brake pedal is less than the maximum brake pedal force threshold at the time when the speed of the vehicle reached zero, this is interpreted as a request to shut off the engine. When the force applied to the brake pedal falls below the minimum brake pedal force threshold, or the total filter output 7 is negative and below a threshold, this is interpreted as a request to restart the engine. When a device embodying the invention determines that the driver is requesting an engine stop or restart, it signals an engine start stop device which stops or restarts the engine. When the vehicle is moving, the fast filter output and slow filter output are set to zero, thus assuring that only changes in force applied to the brake pedal after the vehicle stops, are considered as engine stop or restart requests. Thus, a device embodying the method will not stop the engine of a vehicle during a panic stop, as long as the vehicle is moving, no matter how high the force applied to the brake pedal may be or how rapid the change in brake pedal force.

Alternatively, two digital filters are applied to the driver brake pedal force 1 measurements. One of the two filters is a fast digital low pass filter with a cut off frequency of between 50-500 Hz to produce a fast filter output. A filter cut off frequency of 100 Hz is a preferred value for the fast filter. The fast filter provides an output which reflects the recent force applied to the brake pedal. The second filter is a slow digital low pass filter with a cut off frequency of 4-40 Hz to produce a slow filter output. A cut off frequency of 10 Hz is preferred for the slow filter. The slow filter provides an output which reflects the force applied to the brake pedal over a longer period of time than that measured by the fast filter. The slow filter output is subtracted from the fast filter output to generate a total filter output 7. When the force on the brake pedal is increasing, the total filter output 7 is positive. The size of the total filter output 7 depends upon the rate of change in the force applied to the brake force. When the force on the brake pedal is decreasing, the total filter output 7 is negative. The size of the total filter output 7 depends upon the rate of change in the force applied to the brake pedal. When the force applied to the brake pedal exceeds the minimum brake pedal force threshold, the total filter output 7 is positive and exceeds a threshold, and the force on the brake pedal is less than the maximum brake pedal threshold at the time when the speed of the vehicle reached zero, this is interpreted as a request to shut off the engine. When the force applied to the brake pedal falls below the minimum brake pedal force threshold, or the total filter output 7 is negative and below a threshold, this is interpreted as a request to restart the engine. When a device embodying the invention determines that the driver is requesting an engine stop or restart, it signals an engine start stop device which stops or restarts the engine. When the vehicle is moving, the fast filter output and slow filter output are set to zero thus assuring that only changes in force applied to the brake pedal, after the vehicle stops, are considered as engine stop or restart requests. Thus, a device embodying the method using digital filters will not stop the engine of a vehicle during a panic stop as long as the vehicle is moving, no matter how high the force applied to the brake pedal may be or how rapid the change in brake pedal force.

In order for a driver brake pedal force 1 change to be considered a request to stop the engine, four conditions must be met:
1. The vehicle has stopped.
2. The driver brake pedal force 1 is greater than the minimum brake pedal force threshold.
3. After the vehicle has stopped, the total filter output 7 exceeds a threshold.
4. The driver brake pedal force 1 is less than the maximum brake pedal force threshold at the time when the vehicle speed reaches zero.

These four conditions assure that an engine stop is requested only when the vehicle is stopped, and the driver has indicated a stop request by the manner in which he has increased driver brake pedal force 1. Condition 4 also assures that the engine will not be stopped during a panic stop, because in a panic stop, the driver brake pedal force 1 will exceed the maximum brake pedal force threshold at the time when the vehicle speed reaches zero.

In order for a driver brake pedal force 1 change to be considered a request to restart the engine, one or both of the following two conditions must be met:
1. The driver brake pedal force 1 is less than the minimum brake pedal force threshold or,
2. The total filter output is negative and below a threshold.

If both conditions are met, the driver brake pedal force 1 change is also considered a request to restart the engine.

The minimum brake pedal force threshold is the minimum brake force required to stop the vehicle on a level surface. Different vehicles have different minimum brake pedal force thresholds. The method can use knowledge of the vehicle type to set the minimum brake force request. The maximum brake pedal force threshold is the maximum brake force likely to be used in stopping the vehicle in a non-panic stop. The maximum brake pedal force threshold varies from vehicle to vehicle and also varies somewhat from driver to driver. The maximum brake pedal force threshold is closely related to the force on the brake pedal which will cause the pedal to travel its entire range. The minimum brake pedal force threshold and maximum brake pedal force threshold can be measured for different vehicles and the information can be part of the embodiment of the device. This determination could be made by the vehicle manufacturer if the method is embodied as a program in the ECU at the time of vehicle manufacture. In addition, the minimum brake pedal force threshold and maximum brake pedal force threshold of a wide variety of cars can be measured and this information can be stored in a computer readable data table. This data table can be stored in ROM wherever the computer program is operating. When the computer program is installed in a vehicle, it can obtain vehicle information from a vehicle ECU and look up the minimum brake pedal force threshold and maximum brake pedal threshold for the vehicle. If the minimum brake pedal force threshold and maximum brake pedal threshold are not in the data base associated with the program, they may be manually entered at the time of installation. If the minimum brake pedal force threshold and maximum brake pedal threshold are not known, they may be measured empirically.

If the computer implemented method is embodied as a separate device, the minimum brake pedal force threshold and maximum brake pedal threshold can be communicated to the device through a port such as a USB port. The user may also instruct the device to enter the calibration mode by communicating through a port such as a USB port. Additionally, the user may instruct the device to enter the calibration mode by communicating wirelessly with the device using a standard communication protocol such as Bluetooth or WiFi (IEEE 802.11). If the method is embodied as a computer program operating in an ECU, the minimum brake pedal force threshold and maximum brake pedal force threshold can be communicated to the program as a data file which can be stored in the ECU, which could be added to the ECU at the time the program is added to the ECU. The OBD II port could be used for such communication.

If the minimum brake pedal force threshold and maximum brake pedal force threshold are not known for a vehicle in which the computer implemented method is being installed, they can be determined empirically. During the calibration mode, the device measures the brake pedal force for a number of stops on a level road. During a stop, the device calculates the rate of deceleration. The brake pedal forces during stops with the lowest rates of deceleration are averaged to provide the brake pedal force for the easy stop. The stops having brake pedal forces in the lowest 10-20% are averaged. This average is used as the minimum brake pedal force threshold.

The brake pedal forces during stops with the highest rates of deceleration are averaged to provide the brake pedal force for the hard stop. The stops having brake pedal forces in the highest 10-20% are averaged. This average is used as the maximum brake pedal force threshold. After installation of the method on a vehicle, the unit may be recalibrated if this is necessary because of changes in the brake system. If the method is embodied in a separate device, the user may instruct the device to enter the calibration mode by communicating through a port such as a USB port. If the computer implemented method is embodied as a program operating in an ECU, the user may instruct the device to enter the calibration mode by communicating through the OBD II port.

After an embodiment of the method is installed on a vehicle and the minimum brake pedal force threshold and maximum brake pedal force threshold set, the program uses actual observations of brake pedal force 1 when the vehicle stops to make slow changes to the thresholds. These changes can compensate for changes in the brake system of the vehicle with age. While the program is operating and the vehicle is driving, if the program observes that the brake force required to make an easy stop on a level road is significantly different from the minimum brake pedal force threshold, a slow calibration mode will be entered. This brake force required to make an easy stop on a level road that was just observed will be averaged with the existing minimum brake pedal force threshold using a weighted average.

This brake force required to make an easy stop on a level road that was just observed will be given a low weighting for the weighted average relative to the existing minimum brake pedal force threshold. This prevents rapid changes in the existing minimum brake pedal force threshold. For example, the brake force required to make an easy stop on a level road that was just observed could be given a weighting of $\frac{1}{100}$ that is used to average with the existing minimum brake pedal force threshold.

When the slow calibration mode is entered, the program will continue to monitor for easy stops on a level road. Each time an easy stop on a level road occurs, the brake force required will be observed and averaged with the minimum brake pedal force threshold, using the same weighted average with the same weighting. In this slow calibration mode, the minimum brake pedal force threshold will slowly be updated, with a new value obtained using the weighted average each time the vehicle performs an easy stop on a level road.

The device will exit the slow calibration mode after a large number of easy stops on a level road are observed, for example, 100 stops. The device will exit the slow calibration mode if the program observes that the brake force required to make an easy stop on a level road is not significantly different from the minimum brake pedal force threshold for a certain number of easy stops on a level road, for example, 10 stops.

This same slow calibration mode is also used for the maximum brake pedal force threshold. If the brake force required to make a very hard stop on a level road is significantly different from the maximum brake pedal force threshold, the slow calibration mode will be entered. The same weighted average strategy with the same weighting is used to average the brake force that was just observed with the existing maximum brake pedal force threshold. The same criteria to exit the slow calibration mode are used, with very hard stops on a level road observed instead of easy stops on a level road. In the slow calibration mode, the device uses an inclinometer to determine whether or not the road is level. Only stops made on a level road are averaged.

The method of determining when the vehicle has stopped is not particularly critical. There are several methods of determining whether or not the vehicle has stopped. For example, the device may use the speed sensors which are installed on the vehicle and which provide information to the vehicle speedometer. In some vehicles, speed information is available from the ECU. A wheel speed sensor such as the ACDelco 19181872 front wheel speed sensor may be used to determine the vehicle speed or that the vehicle has stopped. A transmission speed sensor such as ACDelco 213-347 can be used to determine the vehicle speed or that the vehicle has stopped. Accelerometers could also be used to determine whether the vehicle is in motion or whether the vehicle has stopped. An Inertial Measurement Unit (IMU), which uses a combination of accelerometers and gyroscopes, could also be used to determine vehicle speed. In addition to sensors on the vehicle, external sensors such as a GPS unit could be used to determine vehicle speed and to determine whether the vehicle has stopped.

The driver brake pedal force 1 may be determined by a sensor on the brake pedal itself. Alternatively, the brake force being applied by the driver may be measured by brake pedal travel sensors, or brake pedal position sensors such as the ACDelco 13579088 brake pedal position sensor. Brake pedal travel is generally proportional to the force applied to the brake so that the position of the brake pedal can be used to determine how far the brake has moved in making a given stop. The amount of travel is proportional to the applied force. The force being applied to the brake pedal may be determined by measuring the pressure in the hydraulic brake line. This measurement should be made at or before the master cylinder, and before the antilock brake system (ABS). In some vehicles, the pressure in the brake line is measured. In this case, the program can obtain the driver brake pedal force from the ECU.

If the computer implemented method is embodied as a separate device, the input from the speed sensor may be passed through a low pass filter, before going to the slow and fast filters, to exclude high frequency noise which is frequently found in the automotive environment. This prevents such noise from interfering with the slow filter device and the fast filter device. If the computer implemented method is embodied as a computer program operating in an ECU, the ECU should be protected from high frequency noise by a low pass filter. Such low pass filters may be in place as original equipment on the vehicle.

What is claimed:

1. A computer implemented method of signaling that the driver of a vehicle is requesting a shutdown of the engine of a motor vehicle comprising:
    a) determining that the vehicle has stopped;
    b) creating a force measurement to determine the driver brake pedal force;
    c) generating a fast filter output from a predetermined number of driver brake pedal force measurements from step b);
    d) generating a slow filter output from a predetermined number of driver brake pedal force measurements from step b);
    e) calculating a total filter output by subtracting the slow filter output from the fast filter output;
    f) determining if the total filter output exceeds a threshold value;
    g) determining a minimum brake pedal force threshold by averaging vehicle stops with a low rate of deceleration, and actively adjusting the minimum brake pedal force threshold using a weighted average with additional vehicle stops with a low rate of deceleration;
    h) determining if the driver brake pedal exceeds the minimum brake pedal force threshold;
    i) determining a maximum brake pedal force threshold by averaging vehicle stops with a high rate of deceleration, and actively adjusting the maximum brake pedal force threshold using a weighted average with additional vehicle stops with a high rate of deceleration;
    j) determining if the driver brake pedal force is less than the maximum brake pedal force threshold; and
    k) signaling an engine start stop device to shut off the engine if all of the following conditions are met:
        i) the vehicle is stopped,
        ii) the total filter output exceeds a threshold value,
        iii) the driver brake pedal force exceeds the minimum brake pedal force threshold,
        iv) the driver brake pedal force is less than the maximum brake pedal force threshold at the time when the vehicle speed reaches zero while the engine is running.

2. A computer implemented method of signaling that the driver of a vehicle is requesting a restart of a motor vehicle comprising:
    a) determining that the engine is shut off;
    b) creating a force measurement to determine the driver brake pedal force;
    c) determining a minimum brake pedal force threshold by averaging vehicle stops with a low rate of deceleration, and actively adjusting the minimum brake pedal force threshold using a weighted average with additional vehicle stops with a low rate of deceleration;
    d) determining if the driver brake pedal force is less than the minimum brake pedal force threshold;
    e) generating a fast filter output for a predetermined number of driver brake pedal force measurements from step b;
    f) generating a slow filter output for a predetermined number of driver brake pedal force measurements from step b;
    g) calculating a total filter output by subtracting the slow filter output from the fast filter output;
    h) determining if the total filter output is less than a threshold value;
    i) signaling an engine start stop device to start the engine if either one or both of the following conditions are met:
        i) the total filter output is negative and below a threshold value,
        ii) the brake pedal force is less than the minimum brake pedal force threshold.

3. A computer implemented method of claim 1, wherein the method of determining a fast filter output is numerical averaging of a predetermined number of driver brake pedal force measurements, and wherein the method of determining a slow filter output is numerical averaging of a predetermined number of driver brake pedal force measurements.

4. A computer implemented method of claim 2, wherein the method of determining a fast filter is numerical averaging of a predetermined number of driver brake pedal force measurements and wherein the method of determining a slow filter output is numerical averaging of a predetermined number of driver brake pedal force measurements.

5. A computer implemented method of claim 1, wherein the computer implementing the method is operating in a device which is installed in the vehicle.

6. A computer implemented method of claim 1, wherein the computer implementing the method is operating in an ECU in the vehicle.

7. A computer implemented method of claim 2, wherein the computer implementing the method is operating in a device installed in the vehicle.

8. A computer implemented method of claim 2, wherein the computer implementing the method is operating in an ECU in the vehicle.

9. A computer implemented method according to claim 1, wherein the fast filter output is generated by passing the brake pedal force signal through a low pass filter having a cut off frequency of 50 to 500 Hz.

10. A computer implemented method according to claim 9, wherein the low pass filter is a digital filter.

11. A computer implemented method according to claim 10, wherein the low pass filter is selected from the group consisting of a Butterworth filter, Bessel filter, Chebyshev filter, and elliptic filter.

12. A computer implemented method according to claim 11, wherein the low pass filter is a Butterworth filter.

13. A computer implemented method according to claim 9, wherein the low pass filter is an analog filter.

14. A computer implemented method according to claim 13, wherein the low pass filter is selected from the group consisting of a Butterworth filter, Bessel filter, Chebyshev filter, and elliptic filter.

15. A computer implemented method according to claim 14, wherein the low pass filter is a Butterworth filter.

16. A computer implemented method according to claim 1, wherein the slow filter output is generated by passing the brake pedal force signal through a low pass filter having a cut off frequency of 10 to 40 Hz.

17. A computer implemented method according to claim 16, wherein the low pass filter is a digital filter.

18. A computer implemented method according to claim 17, wherein the low pass filter is selected from the group consisting of a Butterworth filter, Bessel filter, Chebyshev filter, and elliptic filter.

19. A computer implemented method according to claim 18, wherein the low pass filter is a Butterworth filter.

20. A computer implemented method according to claim 16, wherein the low pass filter is an analog filter.

21. A computer implemented method according to claim 20, wherein the low pass filter is selected from the group consisting of a Butterworth filter, Bessel filter, Chebyshev filter, and elliptic filter.

22. A computer implemented method according to claim 21, wherein the low pass filter is a Butterworth filter.

23. A computer implemented method according to claim 2, wherein the fast filter output is generated by passing the brake pedal force signal through a low pass filter having a cut off frequency of 100 to 500 Hz.

24. A computer implemented method according to claim 23, wherein the low pass filter is a digital filter.

25. A computer implemented method according to claim 24, wherein the low pass filter is selected from the group consisting of a Butterworth filter, Bessel filter, Chebyshev filter, and elliptic filter.

26. A computer implemented method according to claim 25, wherein the low pass filter is a Butterworth filter.

27. A computer implemented method according to claim 23, wherein the low pass filter is an analog filter.

28. A computer implemented method according to claim 27, wherein the low pass filter is selected from the group consisting of a Butterworth filter, Bessel filter, Chebyshev filter, and elliptic filter.

29. A computer implemented method according to claim 28, wherein the low pass filter is a Butterworth filter.

30. A computer implemented method according to claim 2, wherein the slow filter output is generated by passing the brake pedal force signal through a low pass filter having a cut off frequency of 4 to 40 Hz.

31. A computer implemented method according to claim 30, wherein the low pass filter is a digital filter.

32. A computer implemented method according to claim 31, wherein the low pass filter is selected from the group consisting of a Butterworth filter, Bessel filter, Chebyshev filter, and elliptic filter.

33. A computer implemented method according to claim 32, wherein the low pass filter is a Butterworth filter.

34. A computer implemented method according to claim 30, wherein the low pass filter is an analog filter.

35. A computer implemented method according to claim 34, wherein the low pass filter is selected from the group consisting of a Butterworth filter, Bessel filter, Chebyshev filter, and elliptic filter.

36. A computer implemented method according to claim 35, wherein the low pass filter is a Butterworth filter.

37. A computer implemented method according to claim 10, wherein the low pass filter is a finite impulse response filter.

38. A computer implemented method according to claim 17, wherein the low pass filter is an infinite impulse response filter.

39. A computer implemented method according to claim 17, wherein the low pass filter is an infinite impulse response filter.

40. A computer implemented method according to claim 17, wherein the low pass filter is a finite impulse response filter.

\* \* \* \* \*